US007907516B2

(12) United States Patent
Tochio et al.

(10) Patent No.: US 7,907,516 B2

(45) Date of Patent: Mar. 15, 2011

(54) NODE SETTING APPARATUS, NETWORK SYSTEM, NODE SETTING METHOD, AND COMPUTER PRODUCT

(75) Inventors: Yuji Tochio, Kawasaki (JP); Akio Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 11/822,525

(22) Filed: Jul. 6, 2007

(65) Prior Publication Data

US 2007/0253330 A1 Nov. 1, 2007

(51) Int. Cl.
*G01R 31/08* (2006.01)

(52) U.S. Cl. ........................................ 370/216

(58) Field of Classification Search ..................... None
See application file for complete search history.

(56) References Cited

U.S. PATENT DOCUMENTS

| | | | | |
|---|---|---|---|---|
| 5,023,871 | A * | 6/1991 | Nakayashiki et al. | 370/455 |
| 6,717,922 | B2 * | 4/2004 | Hsu et al. | 370/258 |
| 6,766,482 | B1 * | 7/2004 | Yip et al. | 714/717 |
| 7,181,547 | B1 * | 2/2007 | Millet | 709/251 |
| 7,440,397 | B2 * | 10/2008 | Tsurumi et al. | 370/222 |
| 2006/0215544 | A1 * | 9/2006 | Asa et al. | 370/216 |
| 2006/0215546 | A1 * | 9/2006 | Tochio | 370/218 |
| 2007/0204068 | A1 * | 8/2007 | Oku et al. | 709/251 |
| 2008/0239943 | A1 * | 10/2008 | Hauenstein et al. | 370/216 |

FOREIGN PATENT DOCUMENTS

| | | |
|---|---|---|
| JP | 06-030009 | 2/1994 |
| JP | 08-181708 | 7/1996 |
| JP | 2003-218894 | 7/2003 |
| JP | 2004-076593 | 3/2004 |

OTHER PUBLICATIONS

International Search Report, Mar. 16, 2005, PCT/JP2005/000143, 4-pages.

RFC 3619 (RFRC3619)-Extreme Networks' Ethernet Automatic Protection Switching (EAPS) Version 1; S. Shah, M. Yip; Oct. 2003, 5-pages.

* cited by examiner

*Primary Examiner* — Robert W Wilson

(74) *Attorney, Agent, or Firm* — Staas & Halsey LLP

(57) ABSTRACT

A plurality of nodes are connected to one another so as to form a ring network. A pseudo master node blocks relay of user data on one side, and transmits in the ring network a health packet that contains information about a priority order in which the pseudo master node is to be set as a master node. If the pseudo master node receives the health packet transmitted by it, or receives a health packet transmitted by another node, the pseudo master node judges whether the pseudo master node is to be set as a master node based on the priority order contained in the received health packet.

13 Claims, 17 Drawing Sheets

STATE 19
STATE 20
STATE 21
STATE 22
STATE 23
STATE 24
M
PM
T5
T3
H5
H3
H4
20_1
20_2
20_3
20_4
20_5
20_6
21_1
21_3
21_4
21_5

STATE 29
STATE 30
STATE 31
STATE 32
PM
T
M
H1
H2
H3
H4
H5
H6
$20_1$
$20_2$
$20_3$
$20_4$
$20_5$
$20_6$
$21_1$
$21_2$
$21_3$
$21_4$
$21_5$
$21_6$

FLASH MEMORY
103
SELF-NODE INFORMATION
103a
OTHER-NODE INFORMATION
103b
ROUTING INFORMATION
103c
MAIN MEMORY
102
SELF-NODE INFORMATION
102a
OTHER-NODE INFORMATION
102b
ROUTING INFORMATION
102c
READ-ONLY MEMORY
105
NODE SETTING PROGRAM
105a
CPU
104
NODE SETTING COMPUTER PROCESS
104a
LED
101
INPUT BUTTON
100
BUS
106

NODE SETTING APPARATUS, NETWORK SYSTEM, NODE SETTING METHOD, AND COMPUTER PRODUCT

BACKGROUND OF THE INVENTION

1. Field of the Invention

The present invention generally relates to technology for setting a node as a master node that prevents generation of a loop path by blocking relay of user data in a ring network.

2. Description of the Related Art

These days, it has become possible to efficiently transmit data by applying the Ethernet (registered trademark) technique to ring networks. In a typical ring network, the transmission path of packets is in the form of a loop. Thus, to avoid a situation called a loop phenomenon, where the packets keep going around in the network, one of the nodes in the ring network is set as a master node. The master node can logically block the relay of user data at one of the ports in the ring. A node here means network devices such as computers, hubs, and routers that are connected to one another in the network.

Also a technique called "Ethernet (registered trademark) Automatic Protection Switching" (EAPS) is disclosed by which, when a failure has occurred somewhere in the ring network, the master node opens the port that has been blocked so that the communication of the packets are resumed quickly (see S. Shah and M. Yip, "RFC 3619—Extreme Network's Ethernet Automatic Protection Switching (EAPS) Version 1", [online], [searched on Nov. 29, 2004], on the Internet.

FIG. 15 is a schematic for explaining the conventional EAPS technique. In the example shown in FIG. 15, the ring network is made up of six nodes, namely, nodes $\mathbf{10}_1$ to $\mathbf{10}_6$. One of the nodes, namely the node $\mathbf{10}_1$, is set as a master node (indicated with the letter "M" in the drawing). The master node $\mathbf{10}_1$ logically blocks a port $\mathbf{11}_1$ positioned between the master node $\mathbf{10}_1$ and the adjacent node $\mathbf{10}_2$.

For example, let us imagine that a failure 12 has occurred in a link in the ring network between the nodes $\mathbf{10}_4$ and $\mathbf{10}_5$ (state 1). In the state 1, the master node $\mathbf{10}_1$ opens the port $\mathbf{11}_1$, which is in blocked state, so that communication can be performed among the nodes $\mathbf{10}_1$ to $\mathbf{10}_6$ (state 2).

When the failure 12 has been repaired, the node $\mathbf{10}_4$ logically blocks a port $\mathbf{11}_4$ between the failure 12 and the node $\mathbf{10}_4$, and the node 105 logically blocks a port 115 between the failure 12 and the node 105, thereby preventing occurrence a loop phenomenon (state 3).

After that, the nodes $\mathbf{10}_4$ and $\mathbf{10}_5$ transmit a packet to the master node $\mathbf{10}_1$ to notify that the failure 12 has been repaired and also respectively open the ports $\mathbf{11}_4$ and $\mathbf{11}_5$. The master node $\mathbf{10}_1$ logically blocks the port $\mathbf{11}_1$ again and prevents a loop phenomenon from occurring (state 4).

In the above EAPS technique, however, communication is interrupted twice, namely, when a failure has occurred and when the failure has been repaired. More specifically, because the port that is blocked when the failure has occurred is different from the ports that are blocked when the failure has been repaired, the nodes $\mathbf{10}_1$ to $\mathbf{10}_6$ need to learn routing information twice.

To cope with this problem, a data relaying method is disclosed in Japanese Patent Application No. 2004-076593 in which it is possible to reduce the number of times the routing information needs to be learned to one. FIG. 16 is a drawing for explaining this conventional data relaying method. In the example shown in FIG. 16, the ring network is made up of six nodes, namely, nodes $\mathbf{13}_1$ to $\mathbf{13}_6$. One of the nodes, namely the node $\mathbf{13}_1$, is set as a master node. The master node $\mathbf{13}_1$ logically blocks a port $\mathbf{14}_1$ positioned between the node $\mathbf{13}_1$ and the node $\mathbf{13}_2$.

For example, let us imagine that a failure 15 has occurred in a link in the ring network (state 5). In this situation, the master node $\mathbf{13}_1$ opens the port $\mathbf{14}_1$ so that communication can be performed among the nodes $\mathbf{13}_1$ to $\mathbf{13}_6$. The nodes $\mathbf{13}_4$ and $\mathbf{13}_5$ that are connected to the link in which the failure 15 has occurred logically block ports $\mathbf{14}_4$ and $\mathbf{14}_5$, respectively, that are positioned on the two sides of the failure 15 (state 6).

When the failure 15 has been repaired, the nodes $\mathbf{13}_4$ and $\mathbf{13}_5$ exchange control signals with each other so as to set only one of the nodes, namely the node $\mathbf{13}_4$, as a master node. The other node $\mathbf{13}_5$ is set as a normal node, and the port $\mathbf{14}_5$ that has been blocked by the node $\mathbf{13}_5$ is opened (state 7). In this situation, the link in which the relay of data has been blocked is the same before and after the repair of the failure 15. Thus, the number of times the routing information needs to be learned is only one.

It is also possible to apply this data relaying method to take care of a failure that could occur in a node itself. FIG. 17 is a drawing for explaining this conventional data relaying method that is used when a node failure has occurred. In FIG. 17, an example is shown in which a failure 16 has occurred in the node $\mathbf{13}_4$, and the nodes $\mathbf{13}_3$ and $\mathbf{13}_5$ are respectively blocking the ports $\mathbf{14}_3$ and $\mathbf{14}_5$ that are positioned on the node $\mathbf{13}_4$ side (state 8).

In this situation, when the failure 16 has been repaired, the nodes $\mathbf{13}_3$ and $\mathbf{13}_5$ exchange control signals with each other via the node $\mathbf{13}_4$ (state 9). Only one of the nodes, namely the node $\mathbf{13}_3$, is set as a master node. The other node $\mathbf{13}_5$ is set as a normal node, and the port $\mathbf{14}_5$ is opened (state 10).

According to the conventional techniques described above, however, a problem arises where it is difficult to realize, at a low cost, a ring network in which a master node is efficiently determined when all the nodes that belong to the ring network are started up or when a failure has been repaired.

More specifically, according to the conventional techniques explained with reference to FIGS. 15 and 16, when all of the nodes that belong to the ring network are started up, a master node needs to be set in advance before the start-up. If the nodes are started up without setting a master node, a loop phenomenon occurs.

On the other hand, according to the data relaying method explained with reference to FIG. 17, if a failure has occurred in the node $\mathbf{13}_4$, a problem arises where the process becomes complicated because the node $\mathbf{13}_4$ needs to intermediate, after being repaired, a negotiation between the nodes $\mathbf{13}_3$ and $\mathbf{13}_5$ that are positioned on either side of the node $\mathbf{13}_4$. Thus, how to set a master node appropriately and efficiently is becoming an important issue.

SUMMARY OF THE INVENTION

It is an object of the present invention to at least partially solve the problems in the conventional technology.

According to an aspect of the present invention, a node setting apparatus that judges whether an arbitrary first node from among a plurality of nodes in a ring network is be set as a master node, the master node being a node that prevents generation of a loop path in the ring network by blocking relay of user data in the ring network, includes a data transmitting unit that blocks relay of user data in the ring network on one side of the first node and transmits control data in the ring network, the control data containing a priority order indicative of an order for setting the first node as a master node; and a judging unit that, when the first node receives control data transmitted in the ring network by the first node, or when the first node receives control data transmitted in the ring network by other node, judges whether the first node is to be set as a master node based on a priority order contained in received control data.

According to another aspect of the present invention, a network system includes a plurality of nodes in a ring network, and in which an arbitrary first node from among the nodes judges whether the first node is be set as a master node. The master node being a node that prevents generation of a loop path in the ring network by blocking relay of user data in the ring network. The first node includes a data transmitting unit that blocks relay of user data in the ring network on one side of the first node and transmits control data in the ring network, the control data containing a priority order indicative of an order for setting the first node as a master node; and a judging unit that, when the first node receives control data transmitted in the ring network by the first node, or when the first node receives control data transmitted in the ring network by other node, judges whether the first node is to be set as a master node based on a priority order contained in received control data.

According to still another aspect of the present invention, a node setting method of judging whether an arbitrary first node from among a plurality of nodes in a ring network is be set as a master node, the master node being a node that prevents generation of a loop path in the ring network by blocking relay of user data in the ring network, includes blocking relay of user data in the ring network on one side of the first node and transmitting control data in the ring network, the control data containing a priority order indicative of an order for setting the first node as a master node; and judging, when the first node receives control data transmitted in the ring network by the first node, or when the first node receives control data transmitted in the ring network by other node, whether the first node is to be set as a master node based on a priority order contained in received control data.

According to still another aspect of the present invention, a computer-readable recording medium stores therein a computer program that causes a computer to execute the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail, with reference to the accompanying drawings. It should be noted that the present invention is not limited to these exemplary embodiments.

Figure 1:
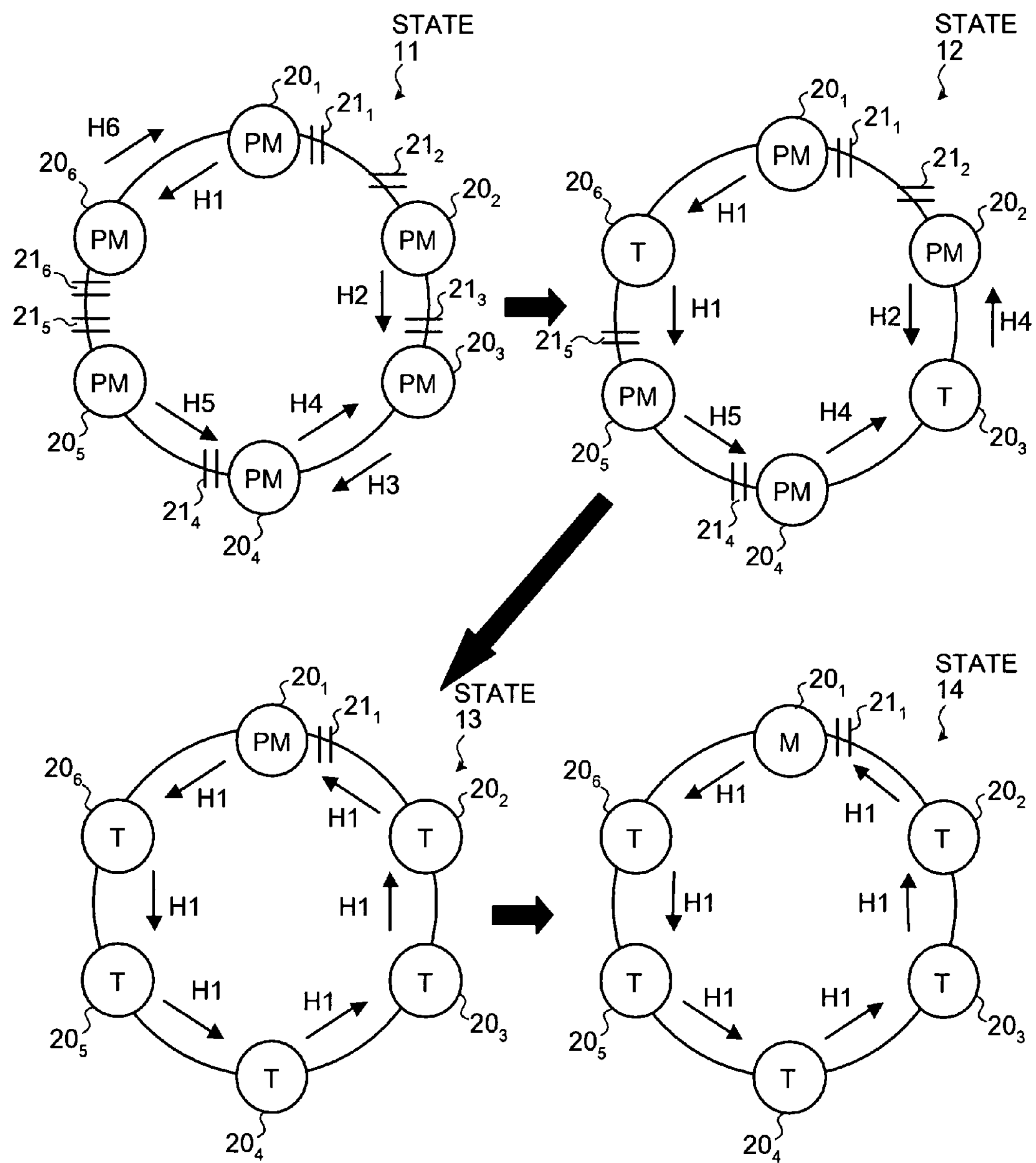
FIG. 1 is a drawing for explaining a concept of a node setting process performed when a ring network is started up.

FIG. 1 is a drawing for explaining how a node setting process is performed when a ring network is started up. In the example shown in FIG. 1, the ring network is made up of six nodes, namely, nodes $\mathbf{20}_1$ to $\mathbf{20}_6$. Each of the nodes $\mathbf{20}_1$ to $\mathbf{20}_6$ has two ports that are respectively connected to two of the nodes $\mathbf{20}_1$ to $\mathbf{20}_6$ that are positioned on either side of the node.

In the node setting process, when the ring network is started up, each of the nodes $\mathbf{20}_1$ to $\mathbf{20}_6$ makes a transition so as to change the state thereof to a state called a pseudo master node. Each of the pseudo master nodes is indicated with the letters "PM" in the drawing.

At ports $\mathbf{21}_1$ to $\mathbf{21}_6$ that are respectively positioned on one side of the nodes $\mathbf{20}_1$ to $\mathbf{20}_6$, the pseudo master nodes block the relay of user data packets. From another set of ports that are respectively positioned on the other side of the nodes $\mathbf{20}_1$ to $\mathbf{20}_6$, the pseudo master nodes transmit health packets H1 to H6 (state 11). The ports $\mathbf{21}_1$ to $\mathbf{21}_6$ that are blocked may be specified in advance or may be determined in a random manner.

The health packets H1 to H6 are control packets that are transmitted by the nodes $\mathbf{20}_1$ to $\mathbf{20}_6$ so as to check to see whether there is any failure in the ring network. When there is no failure in the ring network, the nodes $\mathbf{20}_1$ to $\mathbf{20}_6$ receive the transmitted health packets H1 to H6 at the ports that are positioned opposite the ports from which the health packets H1 to H6 have been transmitted.

When transmitting the health packets H1 to H6, the nodes $\mathbf{20}_1$ to $\mathbf{20}_6$ each transmit information related to a priority order thereof by putting the information into the health packets H1 to H6, the priority order indicating an order in which each of the nodes $\mathbf{20}_1$ to $\mathbf{20}_6$ is to be set as a master node. It is acceptable to assign the priority orders to the nodes $\mathbf{20}_1$ to $\mathbf{20}_6$ in advance. Alternatively, it is also acceptable to use Media Access Control (MAC) addresses assigned to the nodes $20_1$ to $20_6$ as indications of the priority orders.

When having received one of the health packets H1 to H6 from another one of the nodes $20_1$ to $20_6$, each of the nodes $20_1$ to $20_6$ obtains the information related to the priority order contained in the received one of the health packets H1 to H6 and compares the obtained priority order information with the priority order information of its own.

When the nodes 206 and 203 have received the health packets H1 and H4 respectively and found out that the priority orders that are contained in the health packets H1 and H4 transmitted from the nodes $20_1$ and $20_4$ are higher than their own priority orders, the nodes 206 and $20_3$ open the ports $21_6$ and $21_3$ that have been blocked and make transitions so as to change the state thereof to transit nodes (each indicated with the letter "T" in the drawing) that allow the user data packets to be relayed (state 12).

In this situation, the priority orders are specified so that none of the nodes has the same priority order as the other nodes. Thus, while each of the health packets H1 to H6 keeps being transmitted to a different one of the nodes $20_1$ to $20_6$, all the nodes except the node $20_1$ make transitions so as to change the state thereof to a transit node. Accordingly, the ports $21_2$ to $21_6$ that have been blocked by the nodes $20_2$ to $20_6$ are opened (state 13). Also, when the nodes $20_2$ to $20_6$ each have made the transition so as to change the state thereof to a transit node, the transmission of the health packets is stopped.

As a result of the above processes, the node $20_1$ that eventually remains as the pseudo master node receives the health packet H1 that was transmitted therefrom. When having received a corresponding one of the health packets H1 to H6 that was originally transmitted therefrom, each of the nodes $20_1$ to $20_6$ performs a process of making a transition so as to change the state thereof to a master node (indicated with the letter "M") (state 14).

Figure 2:
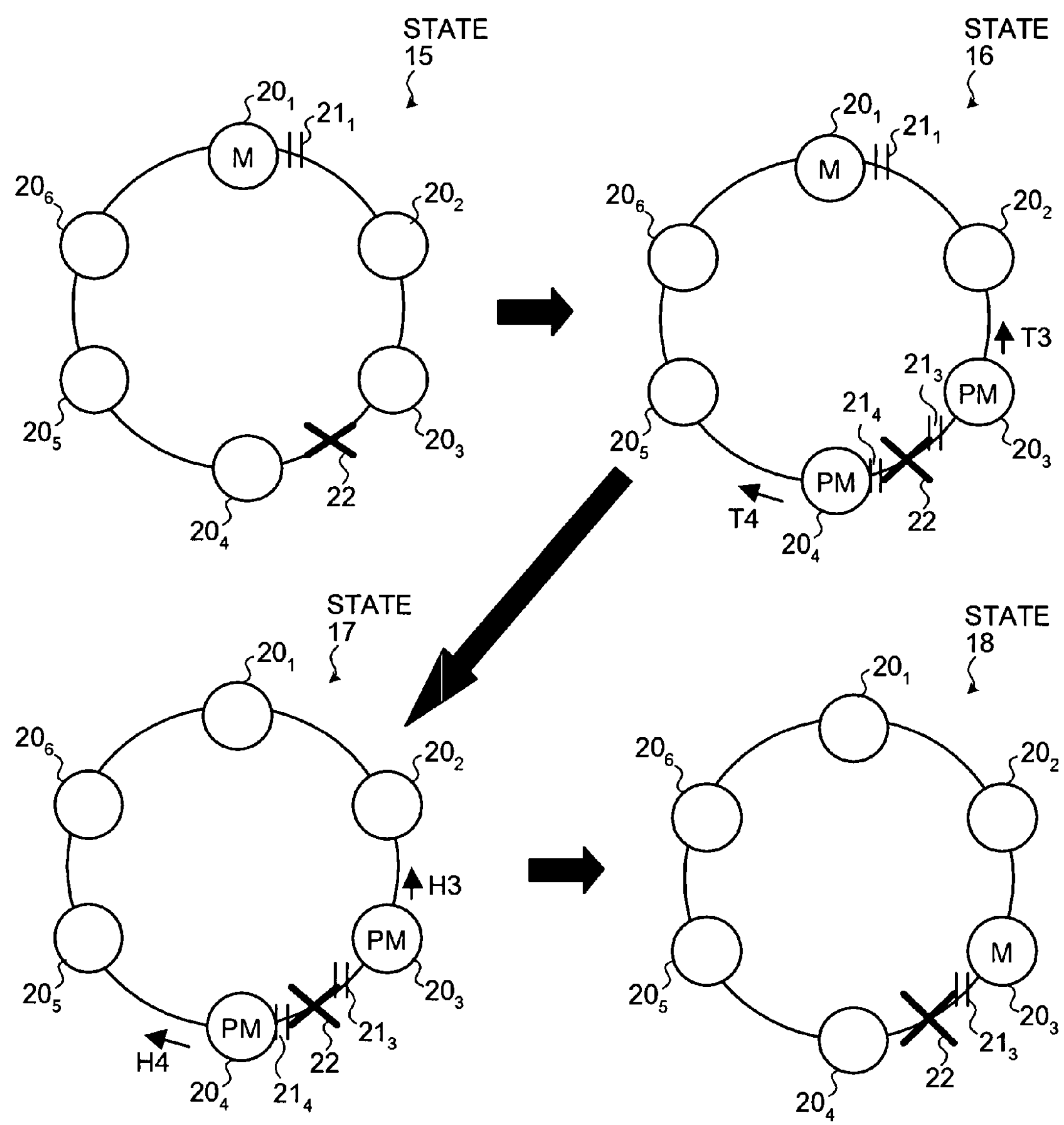
FIG. 2 is a drawing for explaining a concept of a node setting process performed when a link failure has occurred.

FIG. 2 is a drawing for explaining the concept of a node setting process performed when a link failure has occurred. In the example shown in FIG. 2, the node $20_1$ has been set as a master node and it blocks the relay of user data packets performed via the port $21_1$. Let us imagine that a failure 22 has occurred in a link connecting the node $20_3$ and the node $20_4$ to each other (state 15).

In this situation, the nodes $20_3$ and $20_4$ that are connected to the link in which the failure 22 has occurred detect the occurrence of the failure 22 and each set the state thereof as a pseudo master node. The nodes $20_3$ and $20_4$ also block the ports $21_3$ and $21_4$, respectively, that are positioned on the side of the link in which the failure 22 has occurred.

Further, the nodes $20_3$ and $20_4$ respectively transmit trap packets T3 and T4 to notify the node $20_1$ serving as the master node of the occurrence of the failure 22, from the ports that are positioned on the opposite side of the ports $21_3$ and $21_4$ (state 16).

When having received at least one of the trap packets T3 and T4, the node $20_1$ serving as the master node makes a transition so as to change the state thereof to a transit node and opens the port $21_1$ that has been blocked.

On the other hand, after having transmitted the trap packets T3 and T4, the nodes $20_3$ and $20_4$ transmit health packets H3 and H4, respectively. Then, the nodes $20_3$ and $20_4$ wait to receive the health packet from each other. (i.e., the node $20_3$ waits to receive the health packet H4 transmitted from the node $20_4$, whereas the node $20_4$ wait to receive the health packet H3 transmitted from the node $20_3$) (state 17).

When having received the one of the health packets H3 and H4 transmitted from the other of the two nodes, each of the nodes $20_3$ and $20_4$ performs the process of judging whether the state thereof should be a master node or a transit node, based on the information related to the priority order that is contained in the received one of the health packets H3 and H4, in the same fashion as the node setting process explained with reference to FIG. 1.

In the example shown in FIG. 2, the node $20_3$ becomes a master node, whereas the node $20_4$ becomes a transit node (state 18). It means that the priority order of the node $20_3$ is set to be higher than the priority order of the node $20_4$.

When the failure 22 has been repaired, the node $20_3$ continues to function as the master node. Thus, there is no need to set a master node again after the failure 22 is repaired.

Figure 3:
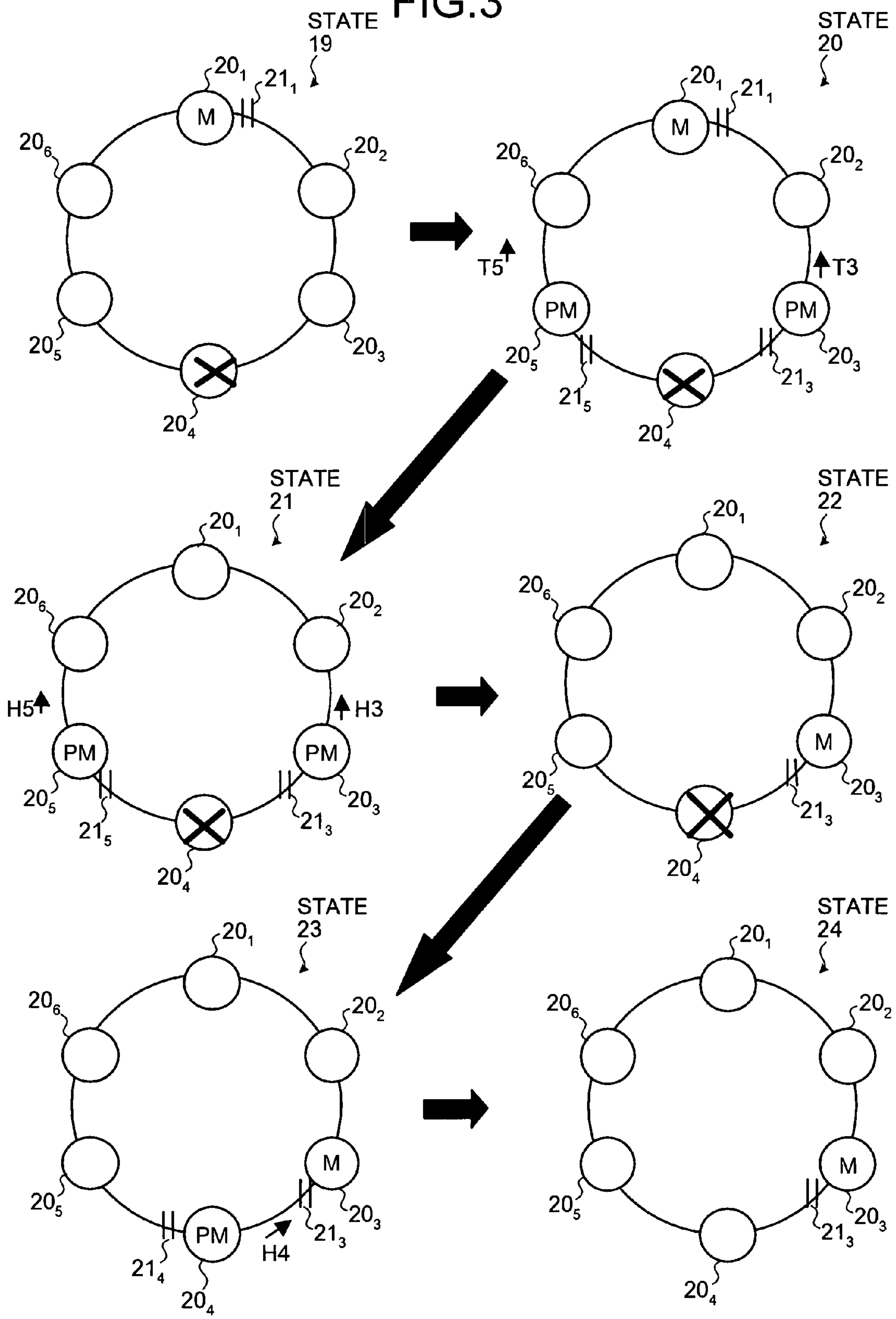
FIG. 3 is a drawing for explaining a concept of a node setting process performed when a node failure has occurred.

It is possible to apply the node setting process not only when a link failure has occurred but also when a node failure has occurred. FIG. 3 is a drawing for explaining the concept of a node setting process performed when a node failure has occurred.

In the example shown in FIG. 3, the node $20_1$ has been set as a master node, and the port $21_1$ is blocking the relay of user data packets. In this example, let us imagine that a failure has occurred in the node $20_4$ (state 19).

In this situation, the nodes $20_3$ and $20_5$ that are positioned on either side of the node $20_4$ in which the failure has occurred detect the occurrence of the failure and block the ports 213 and 215, respectively, that are positioned on the node $20_4$ side, because the failure has occurred in the node $20_4$. Further, the nodes 203 and 205 transmit trap packets T3 and T5, respectively, to notify the master node 201 of the occurrence of the failure (state 20).

After that, when having received at least one of the trap packets T3 and T5, the master node $20_1$ makes a transition so as to change the state thereof to a transit node and opens the port $21_1$ that has been blocked. On the other hand, after having transmitted the trap packets T3 and T5, the nodes $20_3$ and $20_5$ transmit health packets H3 and H5, respectively. The nodes $20_3$ and $20_5$ wait to receive the health packet from each other (i.e., the node $20_3$ waits to receive the health packet H5 transmitted from the node $20_5$, whereas the node $20_5$ wait to receive the health packet H3 transmitted from the node $20_3$) (state 21).

When having received the one of the health packets H3 and H5 transmitted from the other of the two nodes, each of the nodes $20_3$ and $20_5$ performs the process of judging whether the state thereof should be a master node or a transit node, based on the information related to the priority order that is contained in the received one of the health packets H3 and H5, in the same fashion as the node setting process explained with reference to FIG. 1.

In the example shown in FIG. 3, the node $20_3$ becomes a master node, whereas the node $20_5$ becomes a transit node (state 22). It means that the priority order of the node $20_3$ is set to be higher than the priority order of the node $20_5$.

When the failure in the node $20_4$ has been repaired, the node $20_4$ temporarily becomes a pseudo master node. The node $20_4$ then blocks one of the ports, namely $21_4$, and transmits a health packet H4 (state 23).

Because the node $20_3$ serving as a master node transmits a health packet regularly, when the node $20_4$ receives one of such health packets, the node $20_4$ makes a transition so as to change the state thereof to a transit node, as a result of a comparison of priority orders (state 24).

Figure 4:
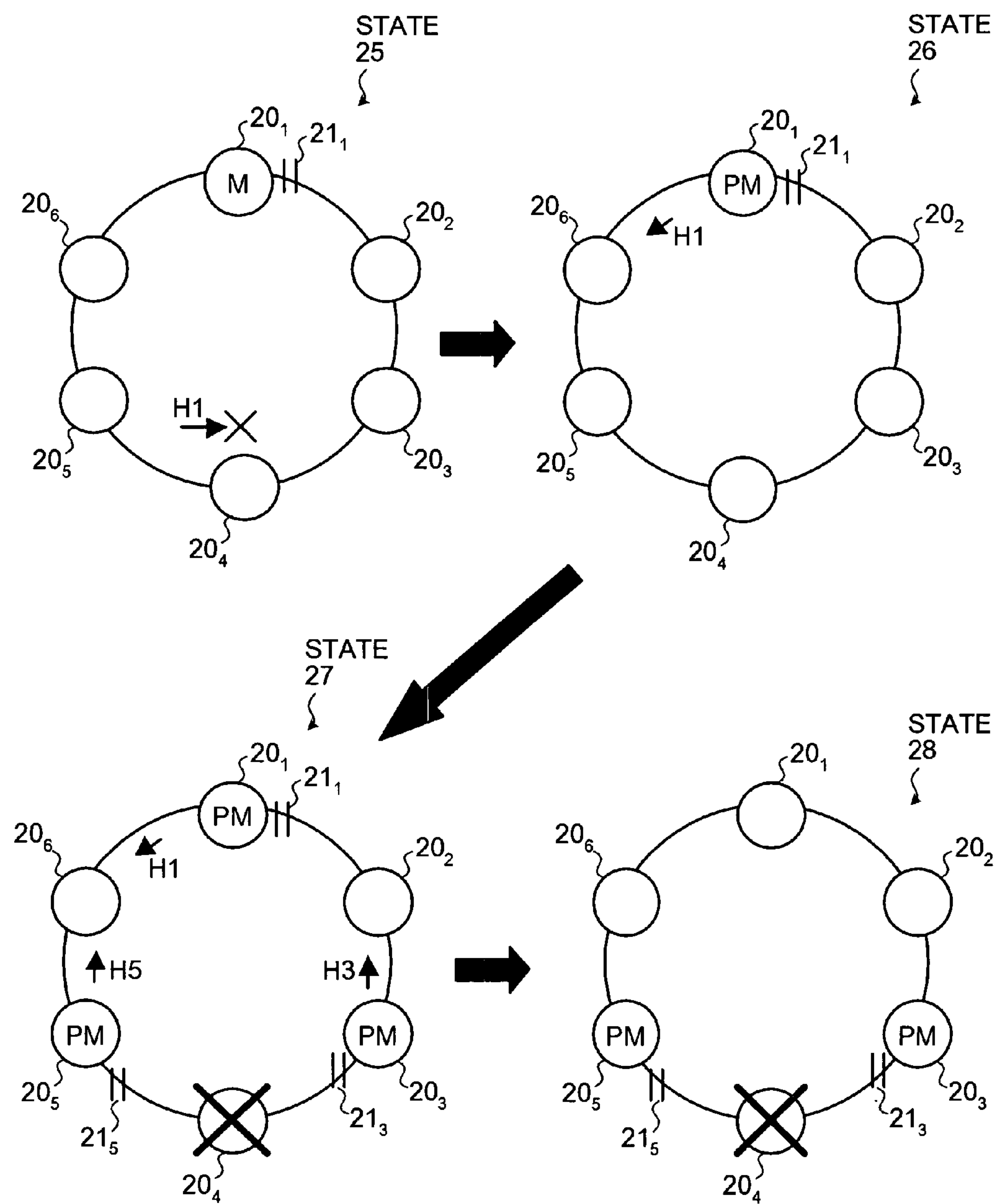
FIG. 4 is a drawing for explaining a concept of a node setting process performed when a health packet has not yet been detected.

When a master node has transmitted a health packet, but the health packet does not come back to the master node before a predetermined period of time elapses, the master node makes a transition so as to change the state thereof to a pseudo master node. FIG. 4 is a drawing for explaining the concept of a node setting process performed when the health packet has not yet been detected.

In the example shown in FIG. 4, the node $\mathbf{20}_1$ has been set as a master node and is blocking the relay of user data packets at the port $\mathbf{21}_1$. The node $\mathbf{20}_1$ also has transmitted a health packet H1 (state 25).

Let us imagine that such a failure has occurred in the node $\mathbf{20}_4$ that prevents the node $\mathbf{20}_4$ only from transmitting health packets. In this situation, because the health packet H1 that has been transmitted by the node $\mathbf{20}_1$ does not come back to the node $\mathbf{20}_1$ before the predetermined period of time elapses, the node $\mathbf{20}_1$ makes a transition so as to change the state thereof to a pseudo master node (state 26).

If the failure that has occurred in the node $\mathbf{20}_4$ shown as state 25 is repaired at this time, and the node $\mathbf{20}_1$ becomes able to receive the health packet H1 transmitted therefrom, the node $\mathbf{20}_1$ makes a transition so as to change the state thereof to a master node again (state 25).

If it is not possible to repair the failure that has occurred in the node $\mathbf{20}_4$, and it is not possible to transmit any signals including health packets, the nodes $\mathbf{20}_3$ and $\mathbf{20}_5$ that are positioned on either side of the node $\mathbf{20}_4$ in which the failure has occurred detect the occurrence of the failure because no signals can be detected, and the nodes $\mathbf{20}_3$ and $\mathbf{20}_5$ each make a transition so as to change the state thereof to a pseudo master node. The nodes $\mathbf{20}_3$ and $\mathbf{20}_5$ then block the ports $\mathbf{21}_3$ and $\mathbf{21}_5$, respectively, that are positioned on the node $\mathbf{20}_4$ side, because the failure has occurred in the node $\mathbf{20}_4$. The nodes $\mathbf{20}_3$ and $\mathbf{20}_5$ also transmit health packets H3 and H5, respectively (state 27).

Subsequently, when having received the health packets H3 and H5, the node $\mathbf{20}_1$ makes a transition so as to change the state thereof to a transit node and opens the port $\mathbf{21}_1$ that has been blocked (state 28). After that, the process that is the same as the one shown in FIG. 3 as state 22, state 23, and state 24 is performed so that a master node can be set.

As explained above, in the node setting process according to the present invention, the ports that relay the user data are blocked, and also the health packets that contain the information related to the priority order in which each of the nodes is to be set as a master node are transmitted. When a node has received such a health packet that was transmitted therefrom or when a node has received a health packet that contains information related to a priority order from another node, it is judged whether the node should be set as a master node, based on the information related to the priority order contained in the received health packet. Thus, it is possible to set a master node in a ring network appropriately and efficiently.

Figure 5:
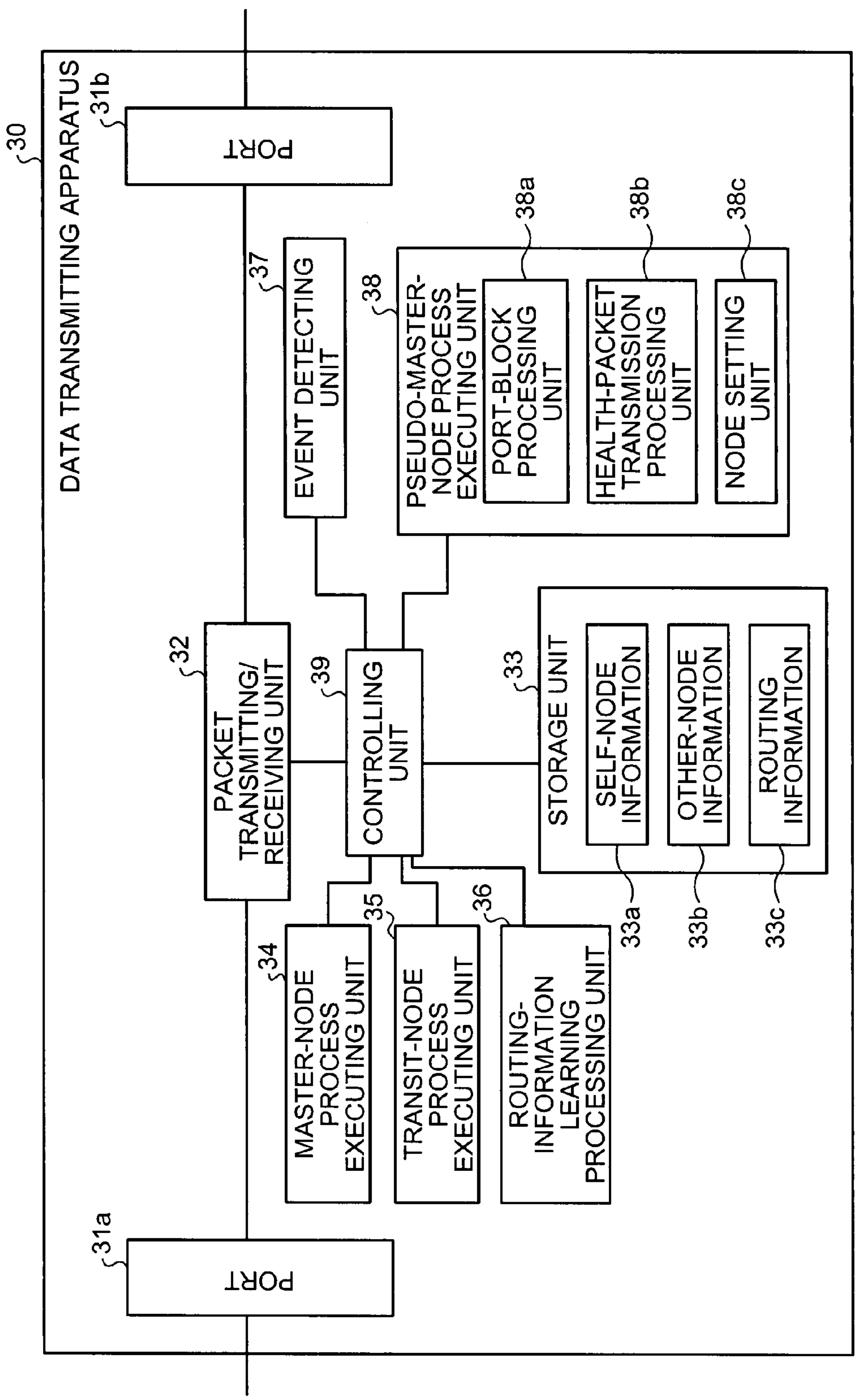
FIG. 5 is a functional block diagram of a data transmitting apparatus according to an embodiment of the present invention.

Next, a functional configuration of a data transmitting apparatus according to the present embodiment will be explained. FIG. 5 is a functional diagram of a data transmitting apparatus 30 according to the present embodiment. The data transmitting apparatus 30 includes ports 31*a* and 31*b*, a packet transmitting/receiving unit 32, a storage unit 33, a master-node process executing unit 34, a transit-node process executing unit 35, a routing-information learning processing unit 36, an event detecting unit 37, a pseudo-master-node process executing unit 38, and a controlling unit 39.

The ports 31*a* and 31*b* relay packets containing user data or control data. The packet transmitting/receiving unit 32 performs processes of transmitting and receiving various types of packets including data packets, trap packets, and health packets, via the ports 31*a* and 31*b*.

The storage unit 33 is a storage device such as a memory. The storage unit 33 stores therein self-node information 33*a*, other-node information 33*b*, and routing information 33*c*.

The self-node information 33*a* is stored information related to the data transmitting apparatus 30 in which the storage unit 33 and the other constituent elements described above are included (hereinafter, "the node"), such as information about the priority order and the MAC address of the node. The other-node information 33*b* is stored information related to priority orders and MAC addresses of nodes other than the node.

The routing information 33*c* is stored information related to transfer destinations of packets. More specifically, in the routing information 33*c*, MAC addresses serving as the transfer destinations of the packets are stored in correspondence with information of ports to which the nodes having the MAC addresses assigned thereto are connected respectively.

The master-node process executing unit 34 executes various types of processes that should be performed by master nodes when the node has been set as a master node. More specifically, to prevent a loop phenomenon from occurring in the network, the master-node process executing unit 34 blocks the relay of user data packets at one of the ports and also performs a process of transmitting a health packet regularly.

Also, when a packet has been received, the master-node process executing unit 34 checks the destination MAC address of the received packet and performs a process of transmitting the packet from an appropriate port by referring to the routing information 33*c*.

The transit-node process executing unit 35 executes various types of processes that should be performed by transit nodes when the node has been set as a transit node. More specifically, when a packet has been received, the transit-node process executing unit 35 checks the destination MAC address of the received packet and performs a process of transmitting the packet from an appropriate port by referring to the routing information 33*c*.

When a flash packet requesting that the routing information 33*c* should be re-learned has been received from another node, the routing-information learning processing unit 36 re-learns the routing information 33*c*.

The event detecting unit 37 performs a process of detecting a start-up of the node and a failure that has occurred in a link or in a node. More specifically, the event detecting unit 37 detects a start-up of the node by detecting that the electric power source has been turned on or that the node has been re-booted.

The event detecting unit 37 also detects a failure that has occurred in a link that is connected to the node or in another node that is connected to such a link, based on information related to the state of signal levels of packets or based on whether there are responses from other nodes.

When having detected a failure, the event detecting unit 37 transmits a trap packet to one or more of the other nodes. In particular, while the node is serving as a master node, the event detecting unit 37 performs a process of transmitting a flash packet to one or more of the other nodes.

Further, while the node is serving as a master node, the event detecting unit 37 detects a failure that has occurred in the network by checking to see whether a health packet transmitted from the node comes back to the node before the predetermined period of time elapses.

When the event detecting unit 37 has detected that the node has been started up or that a failure has occurred, the pseudo-master-node process executing unit 38 sets the node as a pseudo master node and executes various types of processes that should be performed by pseudo master nodes.

The pseudo-master-node process executing unit 38 includes a port-block processing unit 38*a*, a health-packet transmission processing unit 38*b*, and a node setting unit 38*c*.

When the event detecting unit 37 has detected that the node has been started up or that a failure has occurred, the port-block processing unit 38*a* performs a process of blocking the relay of user data packets at one of the two ports.

In this situation, when the failure has been detected in a link that is connected to the node or in another node that is connected to such a link, the port-block processing unit 38*a* blocks the port that is positioned on the failure side.

When the event detecting unit 37 has detected that the node has been started up or that a failure has occurred, the health-packet transmission processing unit 38*b* performs a process of transmitting a health packet that contains information related to the priority order to one or more of the other nodes.

When the packet transmitting/receiving unit 32 has received a health packet, the node setting unit 38*c* compares the information related to the priority order that is contained in the received health packet with the self-node information 33*a* that is stored in the node as the priority order information thereof, so as to perform the process of judging whether the priority order of the node is higher.

When the priority order of the node is lower, the node setting unit 38*c* sets the node as a transit node. When the priority order of the node is higher, the node setting unit 38*c* waits until a next health packet is received so as to judge again if the priority order of the node is higher.

If the node has received the health packet transmitted therefrom, without receiving any other health packet that contains information related to a priority order higher than the priority order of the node, the node setting unit 38*c* sets the node as a master node.

Incidentally, if the failure 22 has occurred as shown in FIG. 22, the nodes 20$_3$ and 20$_4$ that are connected to the link in which the failure 22 has occurred each make a transition so as to change the state thereof to a pseudo master node; however, if the node 20$_1$ serving as a master node has already transmitted health packets before receiving the trap packets T3 and T4, a problem arises where the nodes 20$_3$ and 20$_4$ each make a transition so as to change the state thereof to a transit node immediately after receiving the health packet.

To cope with this problem, the packet transmitting/receiving unit 32 included in each of the nodes 20$_3$ and 20$_4$ waits until the node 20$_1$ serving as the master node transmits a flash packet that erases the routing information stored in each of the nodes in response to the node 20$_1$'s receiving the trap packets T3 and T4. In other words, the packet transmitting/receiving unit 32 in each of the nodes 20$_3$ and 20$_4$ transmits and receives health packets only after receiving the flash packet transmitted by the node 20$_1$.

Figure 6:
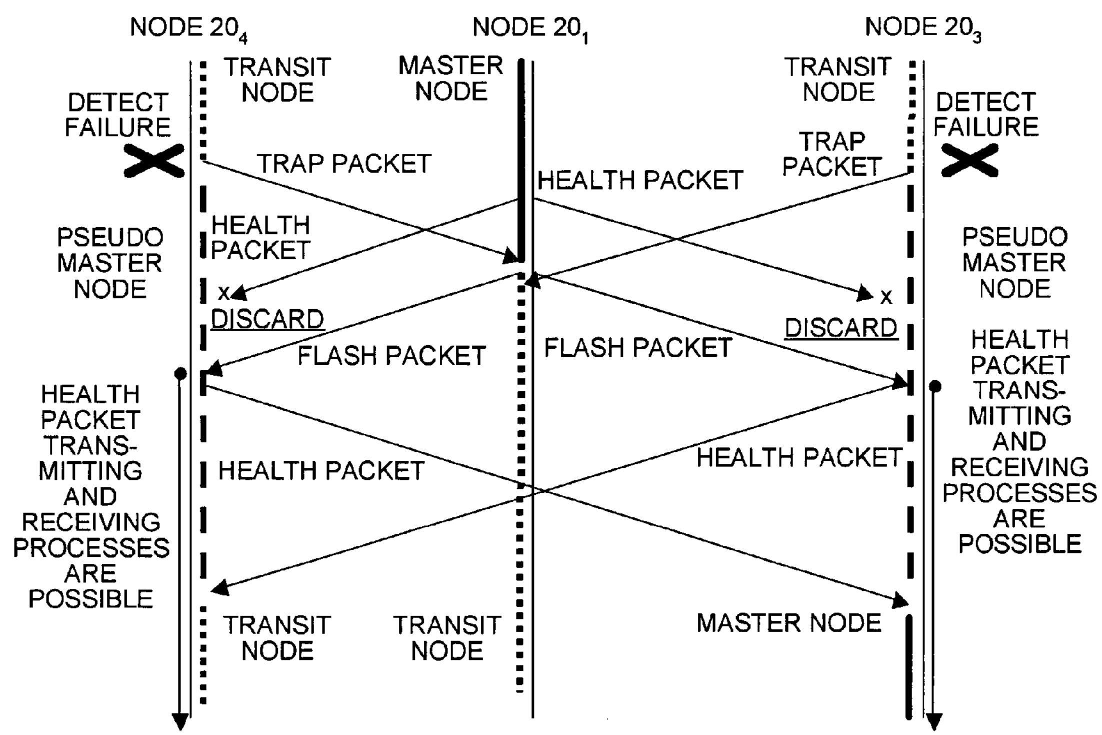
FIG. 6 is a drawing for explaining a transmission and reception permitting process for health packets performed by a pseudo master node.

FIG. 6 is a drawing for explaining a transmission and reception permitting process for health packets performed by a pseudo master node. FIG. 6 corresponds to a situation shown in FIG. 2 in which a link failure has occurred. As shown in FIG. 6, when having detected a failure, each of the nodes 20$_3$ and 20$_4$ transmits a trap packet to the node 20$_1$ serving as the master node.

The node 20$_1$ serving as the master node transmits a health packet regularly. Each of the nodes 20$_3$ and 20$_4$ serving as pseudo master nodes discards the received health packets until the node receives a flash packet that is transmitted in response to the trap packet.

After having received the trap packet, each of the nodes 20$_3$ and 20$_4$ performs the same process as the one shown in state 17 and state 18 explained with reference to FIG. 2. With this arrangement, it is possible to solve the problem where each of the nodes 20$_3$ and 20$_4$ prematurely makes a transition so as to change the state thereof to a transit node immediately after receiving the health packet transmitted by the master node, before transmitting a health packet.

The routing-information learning processing unit 36 included in each of the nodes re-learns the routing information 33*c* every time the node has received a flash packet. With this arrangement, it is possible to appropriately manage the number of times the re-learning process is performed so that the transmission path is re-learned every time occurrence of a failure is detected.

Returning to the description of FIG. 5, the controlling unit 39 is a controlling unit that exercises overall control of the data transmitting apparatus 30 and controls data exchange among the functional units.

Figure 7:
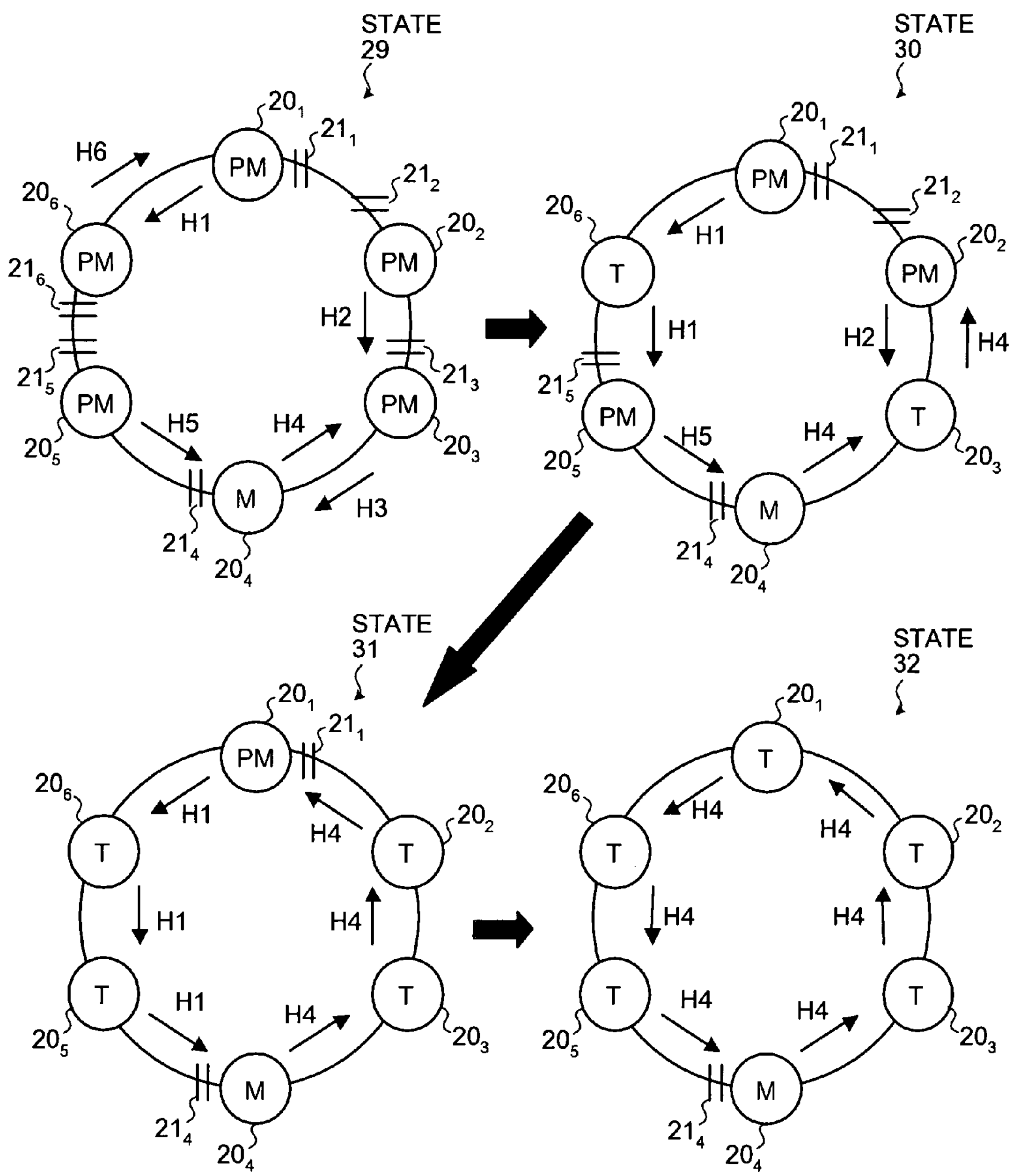
FIG. 7 is a drawing for explaining a master node compulsory setting process.

It is possible to apply the node setting process according to the present invention to a situation where it is desired to set a node as a master node in a compulsory manner. FIG. 7 is a drawing for explaining a master node compulsory setting process. In the example shown in FIG. 7, a ring network is made up of six nodes, namely, the nodes 20$_1$ to 20$_6$.

In this master node setting process, the priority order of the node 20$_4$ is set to be the highest so that 20$_4$ functions as a master node when the ring network is started up. The other nodes, namely the nodes 20$_1$ to 20$_3$, 20$_5$, and 20$_6$ each make a transition so as to change the state thereof to a pseudo master node when the ring network is started up.

At the ports 21$_1$ to 21$_6$ that are respectively positioned on one side of the nodes 20$_1$ to 20$_6$, each of the nodes 20$_1$ to 20$_6$ blocks the relay of user data packets. From another set of ports that are respectively positioned on the other side of the nodes 20$_1$ to 20$_6$, the nodes 20$_1$ to 20$_6$ transmit the health packets H1 to H6, respectively (state 29).

When having received one of the health packets H1 to H6 from another one of the nodes 20$_1$ to 20$_6$, each of the nodes 20$_1$ to 20$_6$ obtains the information related to the priority order contained in the received one of the health packets H1 to H6 and compares the obtained priority order with the priority order of its own stored therein.

In this example, because the priority order of the node 20$_4$ serving as the master node is set to be the highest, the nodes 20$_1$ to 20$_3$, 20$_5$, and 20$_6$ each make a transition so as to change the state thereof to a transit node (state 30 and state 31). Eventually, the node 20$_4$ serving as the master node receives the health packet H4 that has been transmitted from the node 20$_4$ (state 32).

As explained above, even in the situation where the master node has been set in a fixed manner, it is possible to apply the node setting process according to the present invention.

In addition, the examples shown in FIGS. 1 to 4 are on an assumption that each and all of the nodes is the data transmitting apparatus 30 that performs the node setting process according to the present invention. However, it is possible to apply the node setting process according to the present invention, even if one of the nodes is a data relaying node that only relays packets and does not perform the node setting process according to the present invention.

Figure 8:
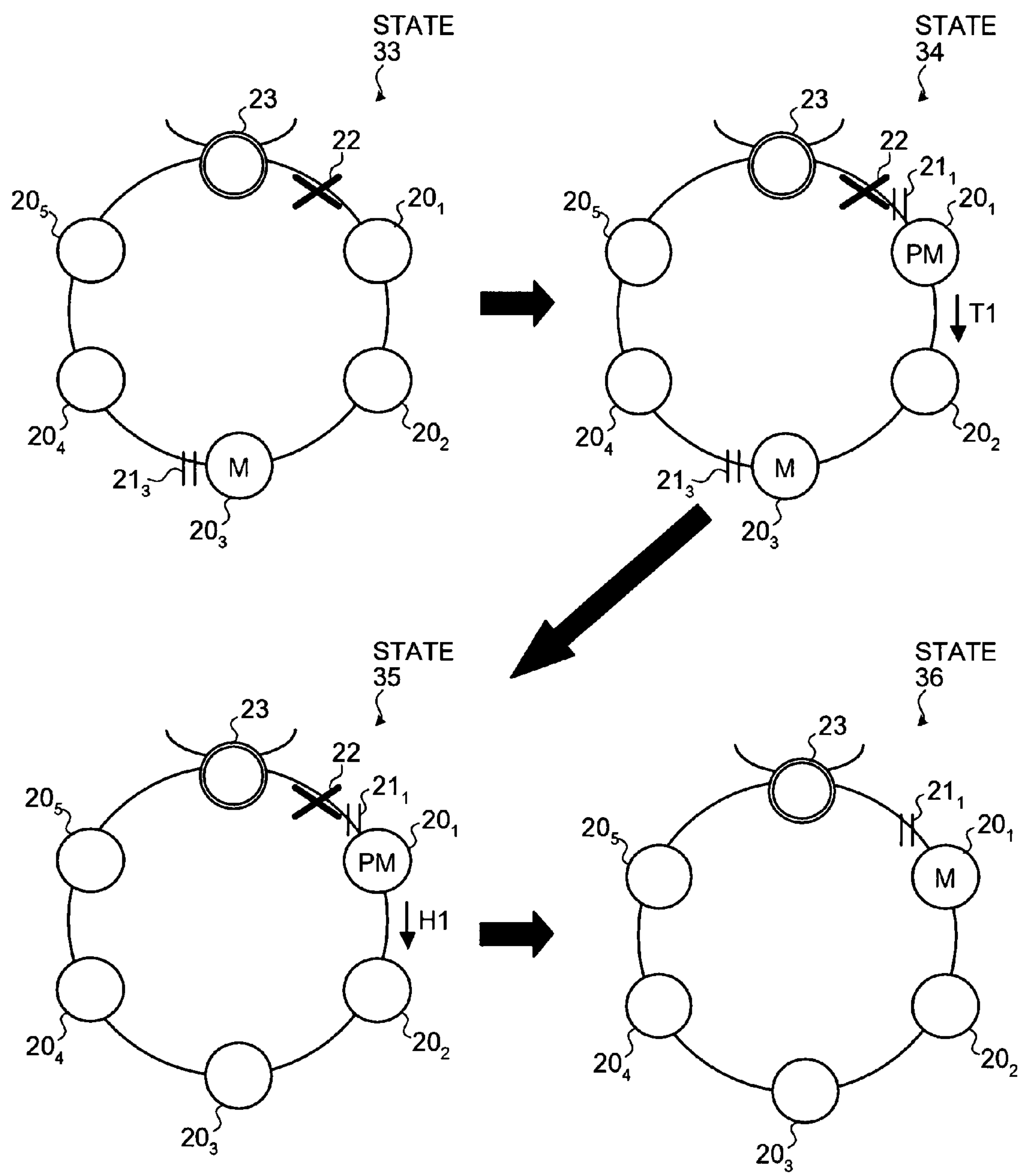
FIG. 8 is a drawing for explaining a node setting process performed when a node that is not the data transmitting apparatus is included in a network.

FIG. 8 is a drawing for explaining a node setting process performed when a node that is not the data transmitting apparatus 30 is included in a network. In the example shown in FIG. 8, the node 20$_3$ has been set as a master node and is blocking the relay of user data packets performed via the port 21$_3$. Let us imagine that the failure 22 has occurred in the link that is connecting a data relaying node 23 and the node 20$_1$ to each other (state 33).

In this example, each of the nodes 20$_1$ to 20$_5$ is realized with the data transmitting apparatus 30 shown in FIG. 5. The data relaying node 23 belongs to both the ring network made up of the nodes 20$_1$ to 20$_5$ and another ring network and has a function to relay packets.

In this situation, the node 20$_1$ detects the occurrence of the failure 22 and makes a transition so as to change the state thereof to a pseudo master node. In other words, the node 20$_1$ blocks the port 21$_1$ that is positioned on the failure 22 side and also transmits a trap packet T1 (state 34).

When the node 20$_3$ serving as a master node has received the trap packet T1, the node 20$_3$ makes a transition so as to change the state thereof to a transit node and opens the port 21$_3$ that has been blocked. On the other hand, the node 20$_1$ serving as a pseudo master node transmits a health packet H1 regularly and keeps functioning as the pseudo master node until the failure 22 is repaired (state 35).

When the failure 22 has been repaired, the node 20$_1$ receives the health packet H1 transmitted therefrom and therefore makes a transition so as to change the state thereof to a master node (state 36). As explained above, it is possible to apply the node setting process according to the present invention to such a situation in which a node that is not the data transmitting apparatus 30 is included in the network.

Figure 9:
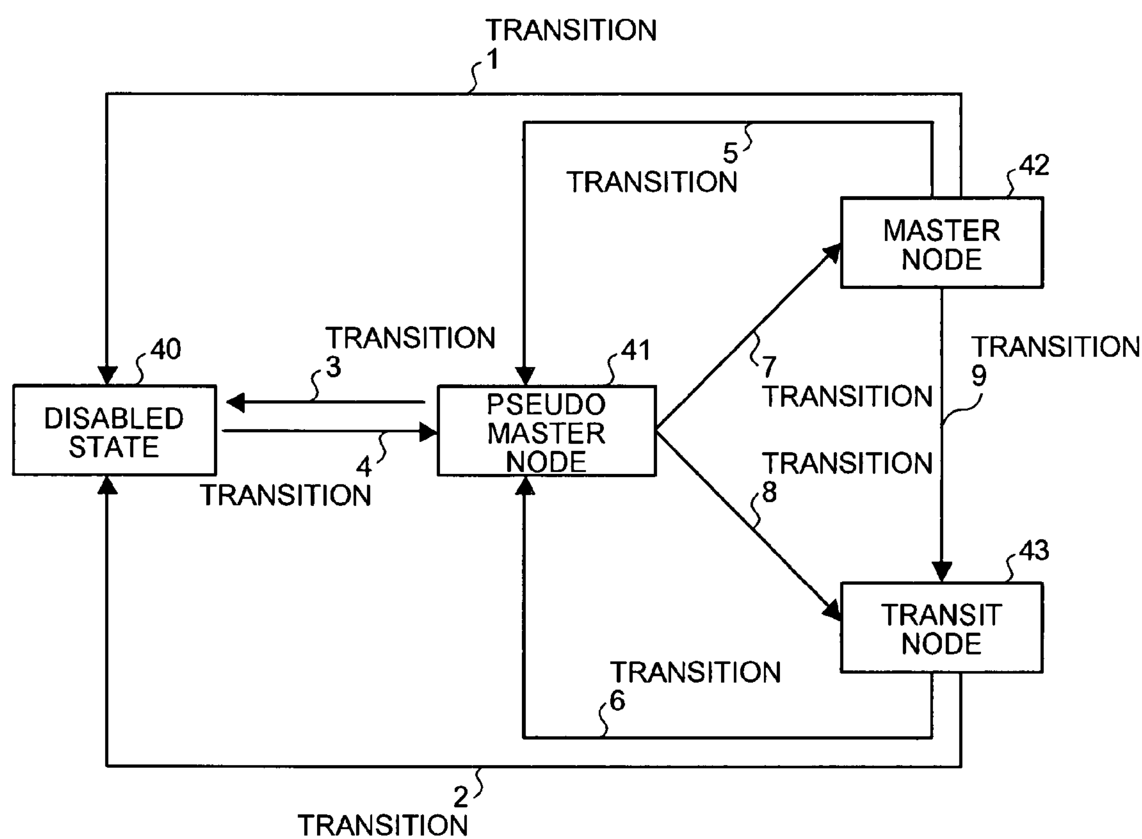
FIG. 9 is a drawing for explaining state transitions of nodes.
Figure 10:
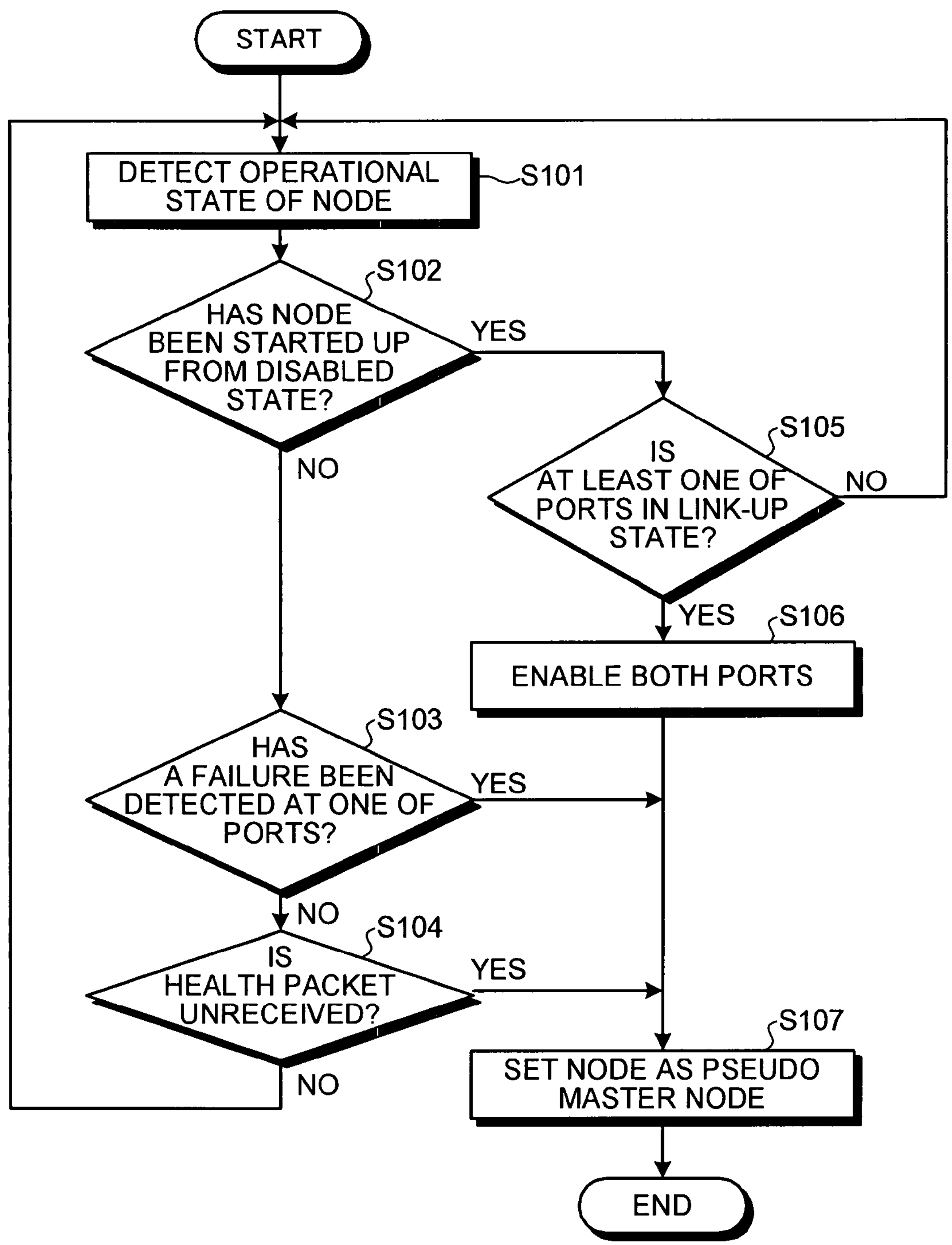
FIG. 10 is a flowchart of a procedure in a pseudo master node transition process.

Next, the procedure in the node setting process according to the present embodiment will be explained, with reference to FIGS. 9 to 12. FIG. 9 is a drawing for explaining state transitions of nodes. FIG. 10 is a flowchart of a procedure in a pseudo master node transition process. The pseudo master node transition process explained with reference to FIG. 10 corresponds to transition 4, transition 5, or transition 6 shown in FIG. 9.

In FIG. 9, a disabled state 40 denotes a situation in which a node is in a link-down state. More specifically, a node makes a transition to a disabled state, when the electric power source of the data transmitting apparatus 30 is turned off, when the data transmitting apparatus 30 is re-booted, or when the node has been operating as a master node 41, a master node 42, or a transit node 43, but has detected two failures (transition 1, transition 2, and transition 3).

As shown in FIG. 10, the node setting unit 38*c* included in the data transmitting apparatus 30 detects an operational state of the data transmitting apparatus 30 (hereinafter, "the node") (step S101). The node setting unit 38*c* then checks to see whether the node has been started up from the disabled state 40 (step S102).

When the node has been started up from the disabled state 40 (Yes at step S102), the node setting unit 38*c* checks to see whether at least one of the ports is in a link-up state (step S105). When neither of the ports is in a link-up state (No at step S105), the process proceeds to step S101, and the processes at the steps thereafter will be continued.

When at least one of the ports is in a link-up state (Yes at step S105), the node setting unit 38*c* enables both of the ports that are positioned on either side of the node (step S106) and sets the node as a pseudo master node (step S107). Thus, the pseudo master node transition process is completed. The processes at steps S102 through S107 correspond to transition 4 shown in FIG. 9.

At step S102, when the node has not been started up from the disabled state 40 (No at step S102), the node setting unit 38*c* checks to see whether the event detecting unit 37 has detected any failure at any of the ports that are positioned on either side of the node (step S103).

When one or more failures have been detected (Yes at step S103), the process proceeds to step S107 so that the node setting unit 38*c* sets the node as a pseudo master node. Thus, the pseudo master node transition process is completed. The processes at steps S103 and S107 correspond to transition 5 or transition 6 shown in FIG. 9.

When no failure has been detected (No at step S103), the node setting unit 38*c* checks to see whether the node is a master node and also the node has not received the health packet that was transmitted therefrom for the predetermined period of time (step S104).

When the node has not received the health packet for the predetermined period of time (Yes at step S104), the process proceeds to step S107 so that the node setting unit 38*c* sets the node as a pseudo master node. Thus, the pseudo master node transition process is completed. When the node has received the health packet (No at step S104), the process proceeds to step S101, and the processes at the steps thereafter will be continued. The processes at steps S103, S104, and S107 correspond to transition 5 shown in FIG. 9.

Figure 11A:
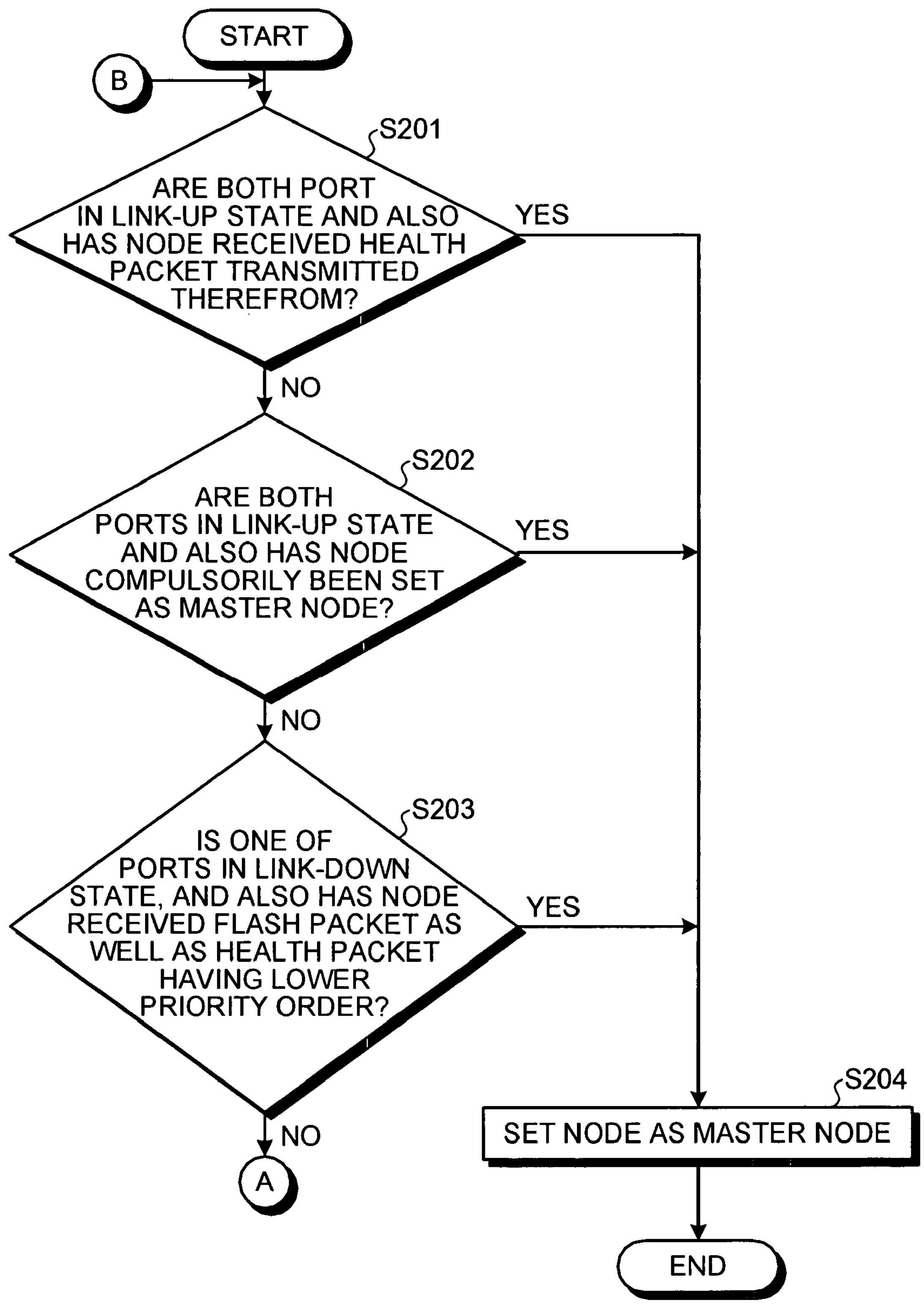
FIGS. 11A and 11B are flowcharts of a procedure in a transition process to transit from a pseudo master node to a master node or to a transit node.
Figure 11B:
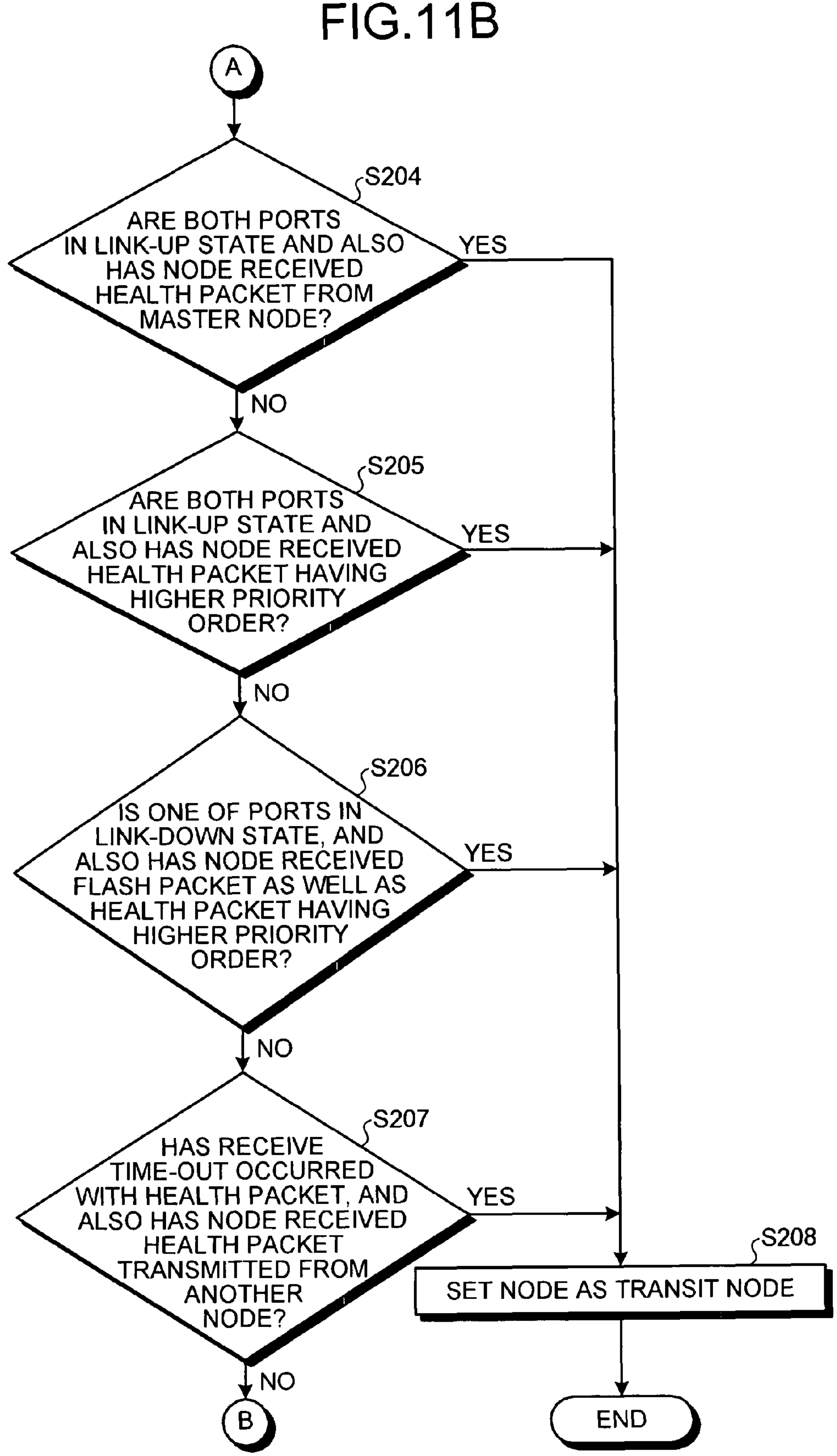

Next, the procedure in a transition process to transit from a pseudo master node to a master node or to a transit node will be explained. FIGS. 11A and 11B are flowcharts (1) and (2) of the procedure in the transition process to transit from a pseudo master node to a master node or to a transit node. This transition process corresponds to transition 7 and transition 8 shown in FIG. 9.

As shown in FIG. 11A, the node setting unit 38*c* included in the data transmitting apparatus 30 checks to see whether both of the ports that are positioned on either side of the data transmitting apparatus 30 (hereinafter, "the node") are in a link-up state and also the node has received a health packet that was transmitted therefrom (step S201).

When both of the ports that are positioned on either side of the node are in a link-up state and also the node has received the health packet that was transmitted therefrom (Yes at step S201), the node setting unit 38*c* sets the node as a master node (step S204), and thus the transition process is completed. This process corresponds to the master node setting process explained with reference to FIG. 1.

When one or both of the two conditions above are not satisfied (i.e., "both of the ports positioned on either side of the node are in a link-up state" is not satisfied, and/or "the node has received the health packet that was transmitted therefrom" is not satisfied) (No at step S201), the node setting unit 38*c* further checks to see whether both of the ports positioned on either side of the node are in a link-up state and also the node has compulsorily been set as a master node (step S202).

When both of the ports that are positioned on either side of the node are in a link-up state and also the node has compulsorily been set as a master node (Yes at step S202), the process proceeds to step S204, so that the node setting unit 38*c* sets the node as a master node. Thus, the transition process is completed. This process corresponds to the master node setting process explained with reference to FIG. 7.

When one or both of the two conditions above are not satisfied (i.e., "both of the ports positioned on either side of the node are in a link-up state" is not satisfied, and/or "the node has compulsorily been set as a master node" is not satisfied) (No at step S202), the node setting unit 38*c* further checks to see whether one of the ports is in a link-down state and also the node has received a flash packet as well as a health packet having a lower priority order than the priority order assigned to the node (step S203).

When the one of the ports is in a link-down state, and also the node has received a flash packet as well as a health packet having a lower priority order (Yes at step S203), the process proceeds to step S204, so that the node setting unit 38*c* sets the node as a master node. Thus, the transition process is completed. This process corresponds to the master node setting process explained with reference to FIG. 2 or FIG. 3. The processes at steps S201 through S204 correspond to transition 7 shown in FIG. 9.

When one or more of the three conditions above are not satisfied, (i.e., "one of the ports is in a link-down state" is not satisfied, and/or "the node has received a flash packet" is not satisfied, and/or "the node has received a health packet having a lower priority order" is not satisfied) (No at step S203), the node setting unit 38*c* further checks to see, as shown in FIG. 11B, whether both of the ports are in a link-up state and also the node has received a health packet from a master node (step S204).

When both of the ports are in a link-up state and also the node has received a health packet from a master node (Yes at step S204), the node setting unit 38*c* sets the node as a transit node (step S208), and thus the transition process is completed. This process corresponds to the transit node setting process explained with reference to FIG. 7.

When one or both of the two conditions above are not satisfied (i.e., "both of the ports are in a link-up state" is not satisfied, and/or "the node has received a health packet from a master node" is not satisfied) (No at step S204), the node setting unit 38*c* further checks to see whether both of the ports are in a link-up state and also the node has received a health packet having a higher priority order than the priority order assigned to the node (step S205).

When both of the ports are in a link-up state and also the node has received a health packet having a higher priority order (Yes at step S205), the process proceeds to step S208 so that the node setting unit 38*c* sets the node as a transit node. Thus, the transition process is completed. This process corresponds to the transit node setting process explained with reference to FIG. 1.

When one or both of the two conditions above are not satisfied (i.e., "both of the ports are in a link-up state" is not satisfied and/or "the node has received a health packet having a higher priority order" is not satisfied) (No at step S205), the node setting unit 38*c* further checks to see whether one of the ports is in a link-down state, and also the node has received a flash packet as well as a health packet having a higher priority order than the priority order assigned to the node (step S206).

When one of the ports is in a link-down state, and also the node has received a flash packet as well as a health packet having a higher priority order (Yes at step S206), the process proceeds to step S208 so that the node setting unit 38*c* sets the node as a transit node. Thus, the transition process is completed. This process corresponds to the transit node setting process explained with reference to FIGS. 2 and 3.

When one or more of the three conditions above are not satisfied, (i.e., "one of the ports is in a link-down state" is not satisfied, and/or "the node has received a flash packet" is not satisfied, and/or "the node has received a health packet having a higher priority order" is not satisfied) (No at step S206), the node setting unit 38*c* further checks to see whether a receive time-out has occurred with the health packet that the node had transmitted while serving as a master node, and also the node has received a health packet transmitted from another node (step S207).

When a receive time-out has occurred with the health packet and also the node has received a health packet transmitted from another node (Yes at step S207), the process proceeds to step S208 so that the node setting unit 38*c* sets the node as a transit node. Thus, the transition process is completed. This process corresponds to the transit node setting process explained with reference to FIG. 4.

When one or both of the two conditions above are not satisfied (i.e., "a receive time-out has occurred with the health packet" is not satisfied and/or "the node has received a health packet transmitted from another node" is not satisfied) (No at step S207), the process proceeds to step S201, and the processes at the steps thereafter are performed again. The processes at steps S204 through S208 correspond to transition 8 shown in FIG. 9.

Figure 12:
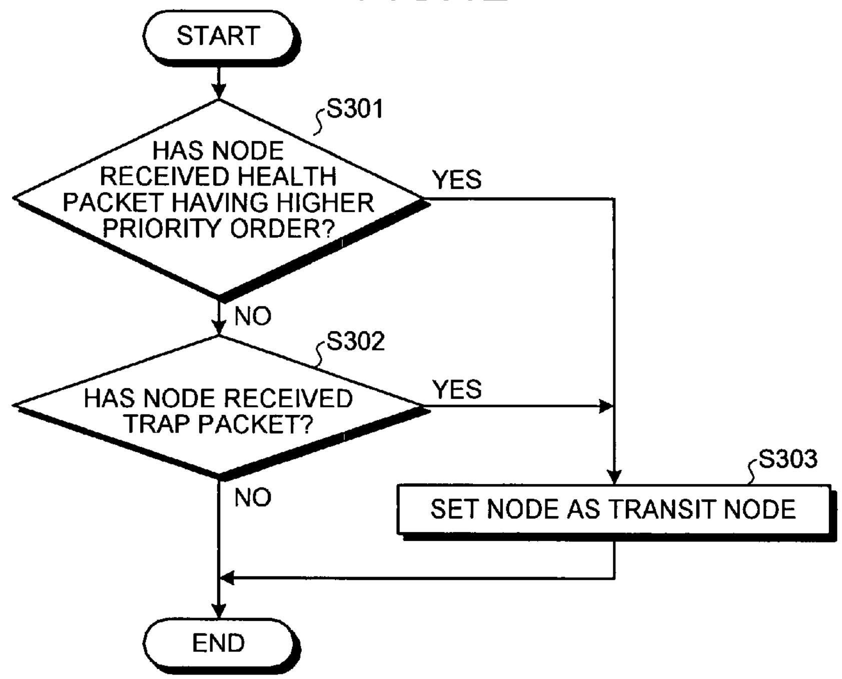
FIG. 12 is a flowchart of a procedure in a transition process to transit from a master node to a transit node.

Next, the procedure in a transition process to transit from a master node to a transit node will be explained. FIG. 12 is a flowchart of the procedure in the transition process to transit from a master node to a transit node. The process shown in FIG. 12 corresponds to transition 9 shown in FIG. 9.

As shown in FIG. 12, the node setting unit 38*c* included in the data transmitting apparatus 30 checks to see whether the data transmitting apparatus 30 (hereinafter, "the node") serving as a master node 42 has received a health packet having a higher priority order than the priority order assigned to the node (step S301).

When the node has received a health packet having a higher priority (Yes at step S301), the node setting unit 38*c* makes a transition so as to change the state thereof to a transit node (step S303), and thus the transition process is completed.

When the node has not received a health packet having a higher priority (No at step S301), the node setting unit 38*c* checks to see whether the node has received any trap packet (step S302).

When the node has received one or more trap packets (Yes at step S302), the process proceeds to step S303 so that the node setting unit 38*c* makes a transition so as to change the state thereof to a transit node. Thus, the transition process is completed. When the node has received no trap packets (No at step S302), the transition process is completed as it is.

In FIG. 6, the example in which the node $\mathbf{20}_1$ serving as a master node transmits the flash packet is shown; however, alternatively, another arrangement is acceptable in which the nodes $\mathbf{20}_3$ and $\mathbf{20}_4$ serving as pseudo master nodes also transmit flash packets in addition to the trap packets.

Figure 13:
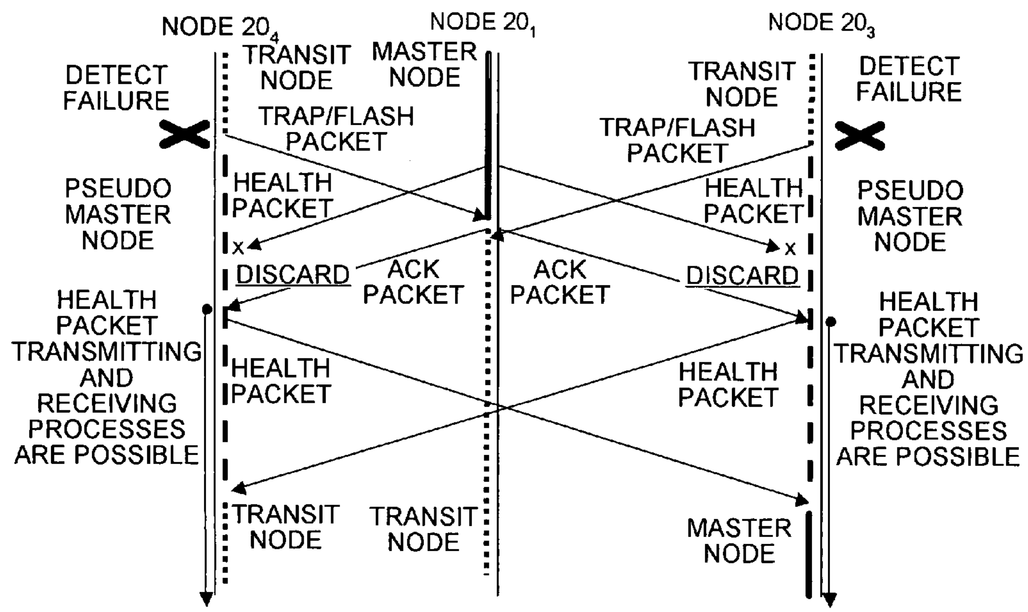
FIG. 13 is a drawing for explaining a transmission and reception permitting process for health packets performed when each pseudo master node transmits a trap packet and a flash packet.

FIG. 13 is a drawing for explaining a transmission and reception permitting process for health packets performed when each pseudo master node transmits a trap packet and a flash packet. In the example shown in FIG. 13, the node $\mathbf{20}_1$ serving as a master node transmits acknowledgement (ACK) packets to notify the nodes $\mathbf{20}_3$ and $\mathbf{20}_4$ that the node $\mathbf{20}_1$ has received the trap packets and the flash packets.

Each of the nodes $\mathbf{20}_3$ and $\mathbf{20}_4$ serving as the pseudo master nodes discards any health packets received by the node until the node receives the ACK packet. In other words, each the nodes $\mathbf{20}_3$ and $\mathbf{20}_4$ permits transmission and reception of health packets only after the node receives the ACK packet.

In this situation, the routing-information learning processing unit 36 included in each of the nodes re-learns the routing information 33*c* every time the node receives a flash packet. With this arrangement, it is possible to appropriately manage the number of times the re-learning process is performed so that the transmission path is re-learned every time occurrence of a failure is detected.

As explained above, according to the embodiment of the present invention, the port-block processing unit 38*a* included in the data transmitting apparatus 30 blocks the relay of user data performed on the side of one of the ports of one of the nodes included in the ring network. The health-packet transmission processing unit 38*b* transmits a health packet that contains the information related to the priority order in which the node is to be set as a master node. When the node has received the transmitted health packet or the node has received a health packet that contains information related a priority order of another node, the node setting unit 38*c* judges whether the node should be set as a master node, based on the information related to the priority order contained in the received health packet. Thus, it is possible to set a master node in the ring network appropriately and efficiently.

Also, according to the embodiment, when the node setting unit 38*c* has judged that the node should not be set as a master node, the health-packet transmission processing unit 38*b* stops the transmission of the health packet that contains the information related to the priority order. Thus, it is possible to inhibit unnecessary transmission of health packets.

In addition, according to the embodiment, the event detecting unit 37 detects a failure that has occurred in the ring network. When the event detecting unit 37 has detected a failure, the health-packet transmission processing unit 38*b* transmits a health packet that contains the information related to the priority order. Thus, it is possible to set a master node appropriately and efficiently when a failure has occurred.

Further, according to the embodiment, while the node is serving as a master node, the event detecting unit 37 detects a failure that has occurred in the ring network by checking to see whether the health packet transmitted by the node comes back thereto. Thus, it is possible to detect a failure efficiently. Also, it is possible to set a master node appropriately and efficiently when a failure has occurred.

Furthermore, according to the embodiment, while the node is serving as a master node, if a failure has occurred in a link that is connected on the side of the port at which the node is blocking the relay of user data, or a failure has occurred in a node that is connected to such a link, the node setting unit 38*c* judges that the node should remain as the master node. Thus, it is possible to make judgment appropriately and efficiently so that the state of the node as the master node is maintained.

Also, according to the embodiment, while the node is serving as a transit node, if the event detecting unit 37 has detected a failure, the event detecting unit 37 transmits a trap packet to notify the master node that the event detecting unit 37 has detected the failure. Thus, it is possible to notify the master node of the occurrence of the failure. Consequently, it is possible to cause the master node to perform an appropriate process in response to the occurrence of the failure.

In addition, according to the embodiment, when the node has received the health packet that contains the information related to the priority order or has received a health packet that contains information related to a priority order from another node, after receiving a flash packet transmitted by a master node in response to the master node's receiving a trap packet, the node setting unit 38*c* judges whether the node should be set as a master node based on the information related to the priority order contained in the received health packet. Thus, it is possible to prevent the problem from occurring where the node setting unit 38*c* prematurely judges whether the node should be set as a master node, based on a health packet that had been transmitted by the master node before the master node has received the trap packet.

Further, according to the embodiment, every time the node receives a flash packet transmitted by a master node in response to the master node's receiving a trap packet, the routing-information learning processing unit 36 starts re-learning the routing information 33*c*. Thus, it is possible to appropriately manage the number of times the re-learning process is performed so that the routing information 33*c* is re-learned every time occurrence of a failure is detected.

Furthermore, according to the embodiment, when having detected a failure, the event detecting unit 37 transmits a flash packet. Thus, it is possible to request that another node should re-learn the routing information 33*c*. Consequently, it is possible to cause the other nodes in the network to perform an appropriate process in response to occurrence of a failure.

Also, according to the embodiment, when the node has received the health packet that contains the information related to the priority order or has received a health packet that contains information related a priority order of another node, after receiving an ACK packet transmitted by a master node in response to the master node's receiving a flash packet, the node setting unit 38*c* judges whether the node should be set as a master node based on the information related to the priority order contained in the received health packet. Thus, it is possible to prevent the problem from occurring where the node setting unit 38*c* prematurely judges whether the node should be set as a master node, based on a health packet that had been transmitted by the master node before the master node has received the flash packet.

In addition, according to the embodiment, the routing-information learning processing unit 36 starts re-learning the routing information 33*c* every time the node receives a flash packet. Thus, it is possible to appropriately manage the number of times the re-learning process is performed so that the routing information 33*c* is re-learned every time occurrence of a failure is detected.

Further, according to the embodiment, when the data relaying node 23 having at least the function to relay data is connected to the node as one of the nodes that make up the ring network, the event detecting unit 37 detects a failure in the data relaying node 23 or in a link that connects the data relaying node 23 and the node to each other. When the event detecting unit 37 has detected a failure, the health-packet transmission processing unit 38*b* transmits a health packet that contains the information related to the priority order. Thus, even if the data relaying node 23 that has no function to judge whether the data relaying node 23 should be set as a master node is included in the ring network, it is possible to set a master node appropriately and efficiently.

Figure 14:
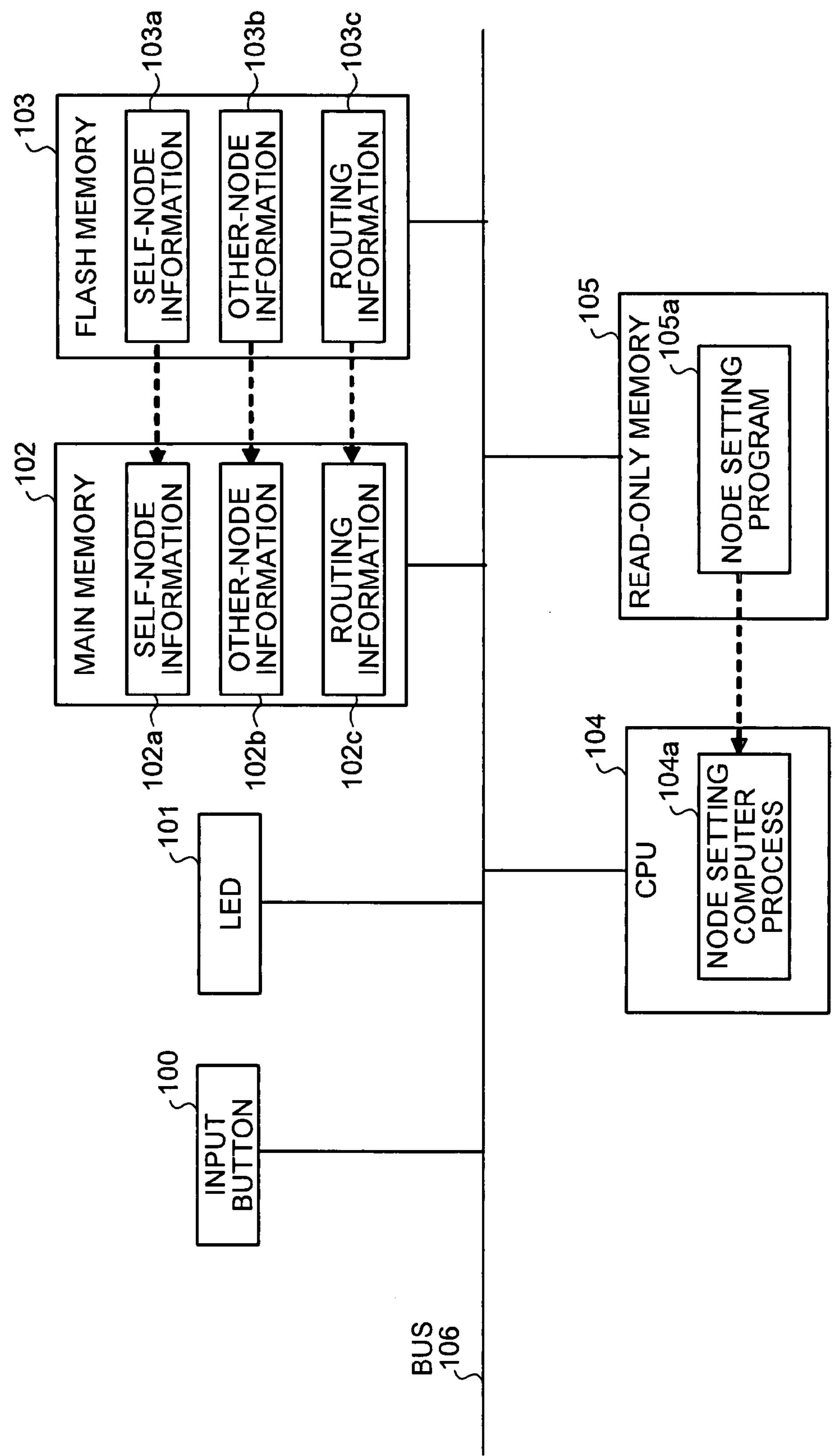
FIG. 14 is a hardware configuration diagram of a computer that serves as the data transmitting apparatus 30 shown in FIG. 5.
Figure 15:
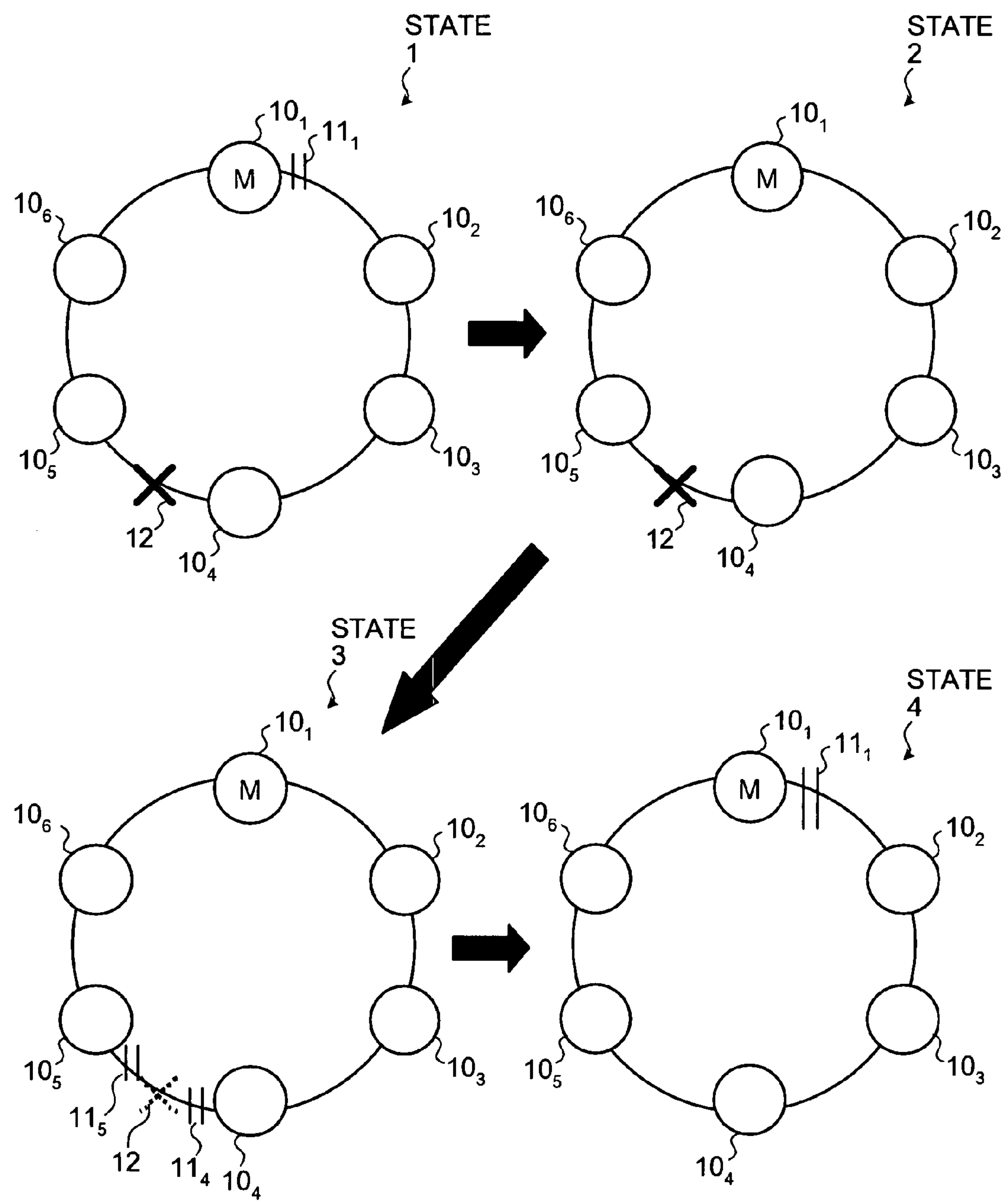
FIG. 15 is a drawing for explaining a conventional EAPS technique.
Figure 16:
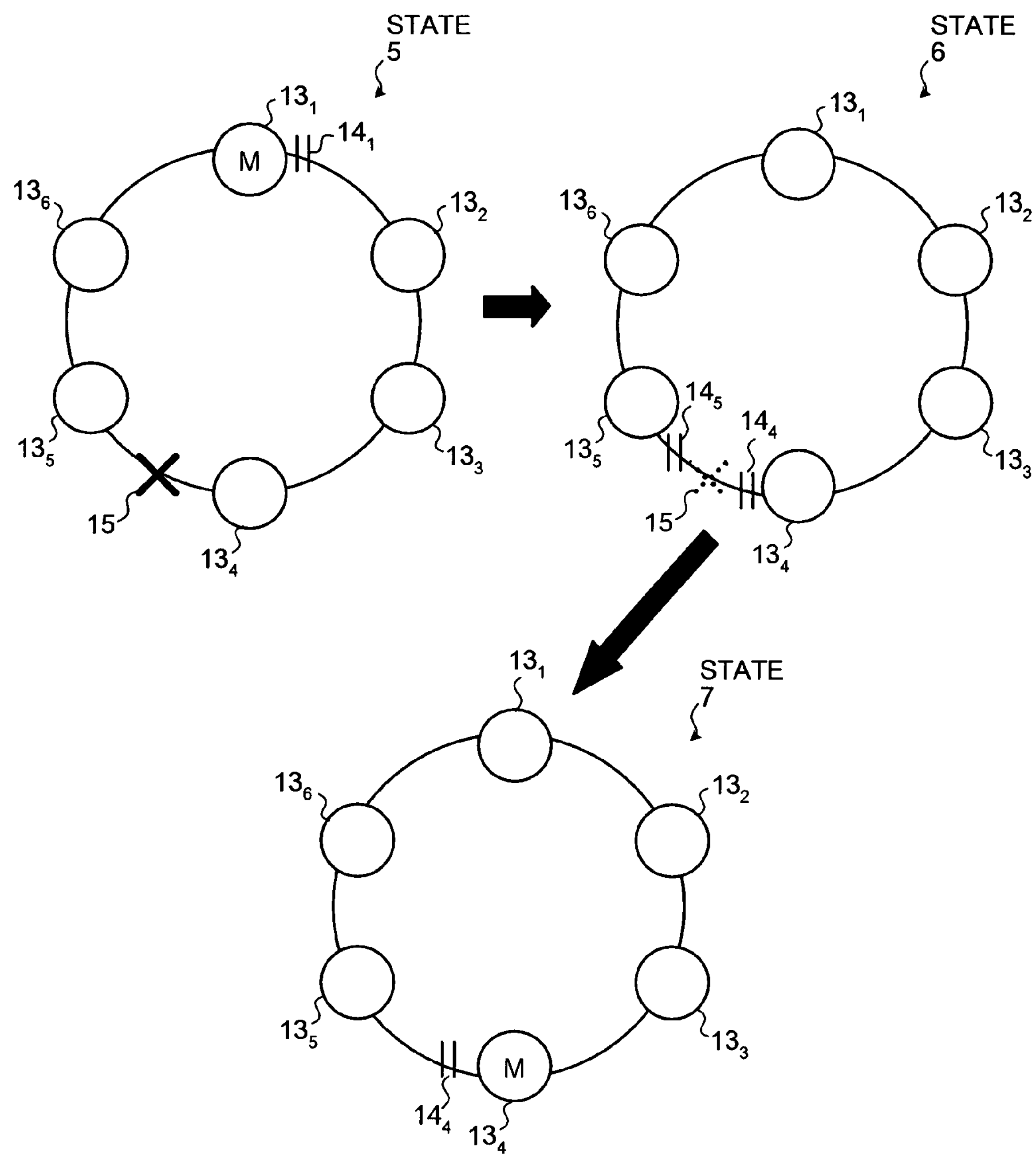
FIG. 16 is a drawing for explaining a conventional data relaying method.
Figure 17:
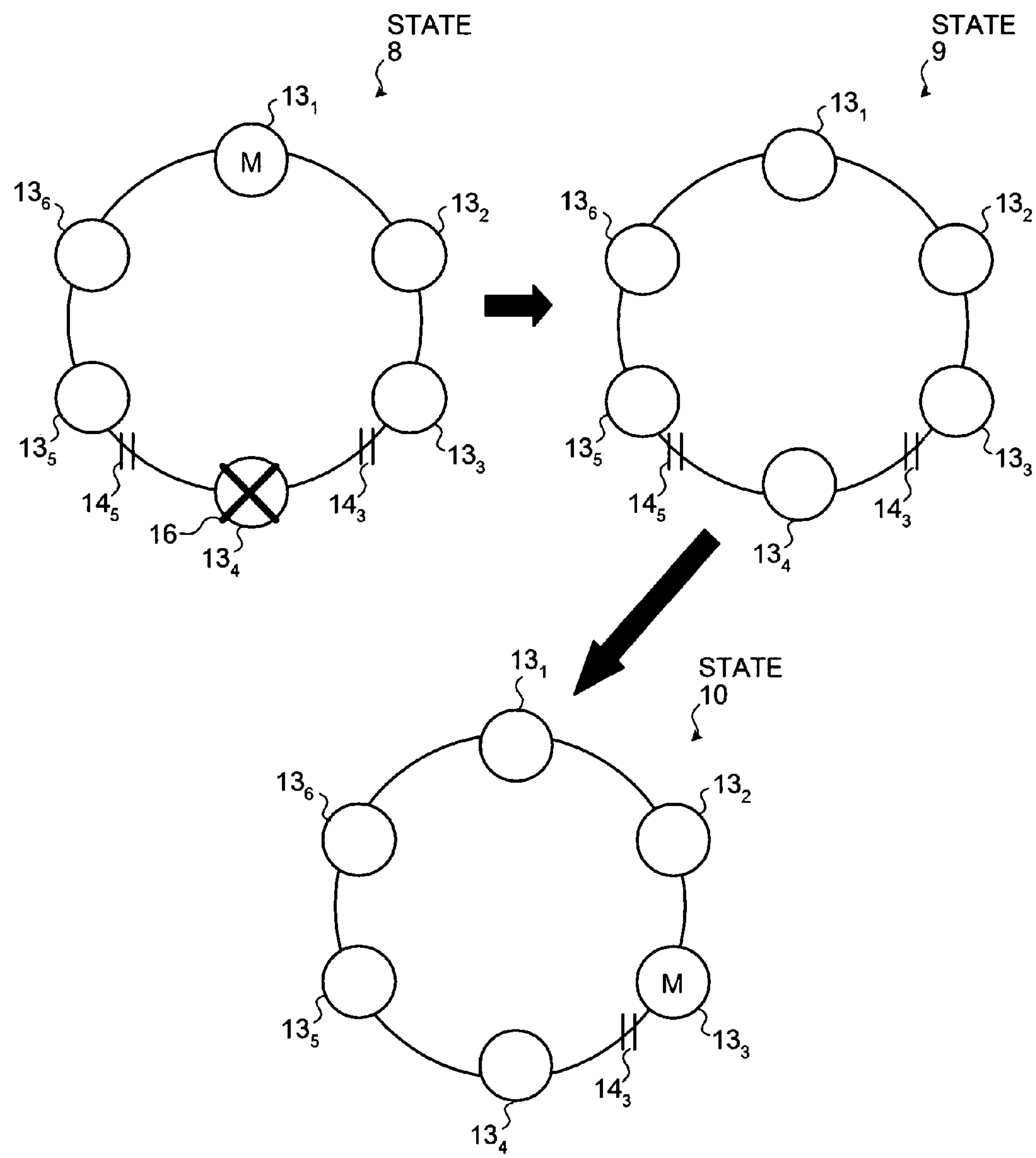
FIG. 17 is a drawing for explaining a conventional data relaying method that is used when a node failure has occurred.

It is possible to realize the various types of processes that are explained in the description of the exemplary embodiment above by executing, on a computer, a program that is prepared in advance. Next, an example of such a computer that executes the program for realizing the various types of processes will be explained with reference to FIG. 14. FIG. 14 is a hardware configuration diagram of the computer that serves as the data transmitting apparatus 30 shown in FIG. 5.

The computer is configured so as to include the following elements that are connected to one another via a bus 106. That is, an input button 100 that receives an input from a user; a Light Emitting Diode (LED) 101 that outputs various types of information; a main memory 102; a flash memory 103; a Central Processing Unit (CPU) 104; and a read-only memory 105.

The read-only memory 105 stores therein a node setting program 105*a*, which is a program that realizes the same function as that of the data transmitting apparatus 30. The node setting program 105*a* may be stored in a distributed manner, as necessary.

When the CPU 104 reads the node setting program 105*a* from the read-only memory 105 and executes the read program, the function of a node setting computer process 104*a* is realized.

The node setting computer process 104*a* corresponds to the function units shown in FIG. 5, namely, the packet transmitting/receiving unit 32, the master-node process executing unit 34, the transit-node process executing unit 35, the routing-information learning processing unit 36, the event detecting unit 37, the pseudo-master-node process executing unit 38, and the controlling unit 39.

The flash memory 103 stores therein self-node information 103*a*, other-node information 103*b*, and routing information 103*c*. The self-node information 103*a*, the other-node information 103*b*, and the routing information 103*c* correspond to the self-node information 33*a*, the other-node information 33*b*, and the routing information 33*c*.

The CPU 104 stores the self-node information 103*a*, the other-node information 103*b*, and the routing information 103*c* into the flash memory 103. The CPU 104 also reads the self-node information 103*a*, the other-node information 103*b*, and the routing information 103*c* from the flash memory 103 and stores the read information into the main memory 102. The CPU 104 then executes the various types of data processes based on self-node information 102*a*, other-node information 102*b*, and routing information 102*c* that are stored in the main memory 102.

The node setting program 105*a* does not necessarily have to be stored in the read-only memory 105 in advance. For example, it is acceptable to store the program in a "portable physical medium" such as a flexible disk (FD), a Compact Disc Read-Only Memory (CD-ROM), an Magneto-Optical (MO) disk, a Digital Versatile Disk (DVD), a magnetic optical disk, an Integrated Circuit (IC) card, or a "stationary physical medium" such as a hard disk drive (HDD) that is provided on the inside or the outside of the computer, or "another computer (or a server)" that is connected to the computer via a public circuit, the Internet, a Local Area Network (LAN), or a Wide Area Network (WAN), so that the computer reads the program from such a storage and executes the read program.

So far, the exemplary embodiment of the present invention has been explained. It should be noted, however, that it is possible to realize the present invention in other various embodiments besides the exemplary embodiment described above, within the scope of technical ideas as defined in the claims.

Also, it is acceptable to manually perform all or a part of the processes that have been explained as to be automatically performed in the description of the embodiment. Further, it is possible to automatically perform all or part of the processes that have been explained as to be manually performed, by using a method that is publicly known.

In addition, the process procedures, the control procedures, specific names, information including various types of data and parameters that have been presented in the present document and the drawings may be arbitrarily modified, unless otherwise noted.

The constituent elements of the data transmitting apparatus 30 that are shown in the drawings are based on functional concepts. Thus, it is not necessary to physically configure the elements as indicated in the drawings. In other words, the specific mode of distribution and integration of the data transmitting apparatus 30 is not limited to the one shown in the drawings. It is acceptable to functionally or physically distribute or integrate all or a part of the apparatus in any arbitrary units, depending on various loads and the status of use.

Further, all or a part of the processing functions performed by the data transmitting apparatus 30 may be realized by a CPU and a program that is analyzed and executed by the CPU or may be realized as hardware using wired logic.

According to an embodiment of the present invention, it is possible to appropriately and efficiently set the master node in the ring network.

Also, according to the embodiment of the present invention, an advantageous effect is achieved where it is possible to inhibit unnecessary transmission of the control data.

In addition, according to the embodiment of the present invention, an advantageous effect is achieved where it is possible to set the master node appropriately and efficiently when a failure has occurred.

Further, according to the embodiment of the present invention, an advantageous effect is achieved where it is possible to detect a failure efficiently and also to set the master node appropriately and efficiently when the failure has occurred.

Furthermore, according to the embodiment of the present invention, an advantageous effect is achieved where it is possible to make the judgment appropriately and efficiently so that the node remains as the master node.

Also, according to the embodiment of the present invention, an advantageous effect is achieved where it is possible to notify the master node of the occurrence of the failure so as to cause the master node to perform an appropriate process in response to the occurrence of the failure.

In addition, according to the embodiment of the present invention, an advantageous effect is achieved where it is possible to avoid the situation in which the judgment as to whether the node should be set as a master node is prematurely made, based on the control data that had been transmitted by the master node before the master node has received the failure detection control data.

Further, according to the embodiment of the present invention, an advantageous effect is achieved where it is possible to appropriately manage the number of times the re-learning process is performed so that the transmission path is re-learned every time occurrence of a failure has been detected.

Furthermore, according to the embodiment of the present invention, an advantageous effect is achieved where it is possible to request that another node should re-learn the information related to the transmission path of the user data and to cause the other nodes in the network to perform an appropriate process in response to the occurrence of the failure.

Also, according to the embodiment of the present invention, an advantageous effect is achieved where it is possible to avoid the situation in which the judgment as to whether the node should be set as a master node is prematurely made, based on the control data that had been transmitted by the master node before the master node has received the routing information learning control data.

In addition, according to the embodiment of the present invention, an advantageous effect is achieved where it is possible to appropriately manage the number of times the re-learning process is performed so that the transmission path is re-learned every time occurrence of a failure has been detected.

Further, according to the embodiment of the present invention, an advantageous effect is achieved where it is possible to set the master node appropriately and efficiently, even if the data relaying node that has no function to judge whether the one of the nodes should be set as a master node is included in the ring network.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A node setting apparatus that sets a first node from among a plurality of nodes in a ring network as a master node, the node setting apparatus comprising:

a failure detecting unit that detects occurrence of a failure in the ring network and transmits failure detection data to notify the master node of the detection of the failure, the master node being a node that restrains generation of a loop path in the ring network by blocking relay of user data in the ring network;

a data transmitting unit that blocks relay of user data in the ring network on one side of the first node and transmits control data in the ring network after receiving a flash packet transmitted in response to the failure detection data transmitted by the failure detecting unit, the control data containing a priority order indicative of an order for setting the first node as the master node; and a judging unit that, when the first node receives control data transmitted in the ring network by the first node or a node other than the first node, judges whether the first node is to be set as the master node based on a priority order contained in received control data.

2. The node setting apparatus according to claim 1, wherein when the judging unit judges that the first node is not to be set as the master node, the judging unit stops transmission of the control.

3. The node setting apparatus according to claim 1, wherein if the first node has been set as the master node, the failure detecting unit detects occurrence of the failure based on whether control data transmitted by the first node comes back to the first node after being transmitted around the ring network.

4. The node setting apparatus according to claim 1, wherein if the first node has been set as the master node and if the failure detecting unit detects occurrence of a the failure in a link on the one side of the first node or in a node that is on the link on the one side of the first node, the judging unit judges that the first node remains as the master node.

5. The node setting apparatus according to claim 1, wherein if the first node receives control data transmitted in the ring network by the first node, or receives control data from an other node, after receiving control data from the master node in response to the failure detection data, the judging unit judges whether the first node is to be set as the master node based on the priority order in received control data.

6. The node setting apparatus according to claim 5, further comprising a routing information learning unit that starts re-learning information related to a transmission path of the user data, every time the first node receives control data from the master node in response to the failure detection data transmitted by the failure detecting unit.

7. The node setting apparatus according to claim 1, wherein when having detected a failure, the failure detecting unit transmits routing information learning data that requests information related to a transmission path of the user data should be re-learned.

8. The node setting apparatus according to claim 7, wherein if the first node receives control data transmitted in the ring network by the first node, or receives control data from other node, after receiving control data transmitted by the master node in response to the routing information leaning data, the judging unit judges whether the first node is to be set as the master node based on the priority order in received control data.

9. The node setting apparatus according to claim 7, further comprising a routing information learning unit that starts re-learning information related to a transmission path of the user data, every time the first node receives the routing information learning data transmitted by the failure detecting unit.

10. A network system that includes a plurality of nodes in a ring network, in which a first node from among the nodes is to be set as a master node, the first node comprising:

a failure detecting unit that detects occurrence of a failure in the ring network and transmits failure detection data to notify the master node of the detection of the failure, the master node being a node that restrains generation of a loop path in the ring network by blocking relay of user data in the ring network;

a data transmitting unit that blocks relay of user data in the ring network on one side of the first node and transmits control data in the ring network after receiving a flash packet transmitted in response to the failure detection data transmitted by the failure detecting unit, the control data containing a priority order indicative of an order for setting the first node as the master node; and a judging unit that, when the first node receives control data transmitted in the ring network by the first node, or a node other than the first node, judges whether the first node is to be set as the master node based on a priority order contained in received control data.

11. The network system according to claim 10, wherein when a data relaying node that has at least a function to relay data is connected to the first node, the failure detecting unit is operable to detect occurrence of the failure in the data relaying node itself or in a link that connects the data relaying node to the first node, and when the failure detecting unit detects the failure, the data transmitting unit transmits the control data.

12. A method of setting a first node from among a plurality of nodes in a ring network as a master node, the method comprising:

detecting occurrence of a failure in the ring network and transmitting failure detection data to notify the master node of the detection of the failure, the master node being a node that restrains generation of a loop path in the ring network by blocking relay of user data in the ring network;

blocking relay of user data in the ring network on one side of the first node and transmitting control data in the ring network after receiving a flash packet transmitted in response to the failure detection data transmitted in the detecting, the control data containing a priority order indicative of an order for setting the first node as the master node; and judging, when the first node receives control data transmitted in the ring network by the first node or a node other than the first node, whether the first node is to be set as the master node based on a priority order contained in received control data.

13. A non-transitory computer-readable recording medium which stores therein a computer program executable by a computer which performs the following steps:

detecting occurrence of a failure in a ring network and transmitting failure detection data to notify a master node of the detection of the failure, the master node being a node that restrains generation of a loop path in the ring network by blocking relay of user data in the ring network:

blocking relay of user data in the ring network on one side of a first node and transmitting control data in the ring network after receiving a flash packet transmitted in response to the failure detection data transmitted in the detecting, the control data containing a priority order indicative of an order for setting the first node from among a plurality of nodes n the ring network as the master node; and judging, when the first node receives control data transmitted in the ring network by the first node or a node other than the first node, whether the first node is to be set as the master node based on a priority order contained in received control data.

* * * * *

UNITED STATES PATENT AND TRADEMARK OFFICE

CERTIFICATE OF CORRECTION

PATENT NO. : 7,907,516 B2
APPLICATION NO. : 11/822525
DATED : March 15, 2011
INVENTOR(S) : Yuji Tochio et al.

It is certified that error appears in the above-identified patent and that said Letters Patent is hereby corrected as shown below:

Column 19, Line 21 in Claim 4, after "occurrence of" delete "a".

Column 20, Line 57 in Claim 13, delete "n" and insert -- in --, therefor.

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,907,516 B2
APPLICATION NO. : 11/822525
DATED : March 15, 2011
INVENTOR(S) : Yuji Tochio et al.

It is certified that error appears in the above-identified patent and that said Letters Patent is hereby corrected as shown below:

Title page, item (63) should read as follows:

-- (63) Related U.S. Application Data:
Continuation of application No. PCT/JP2005/000143, filed January 7, 2005 -- therefore Signed and Sealed this
Ninth Day of October, 2012

David J. Kappos
*Director of the United States Patent and Trademark Office*